US012717830B2

(12) United States Patent
Miculicich Werlen et al.

(10) Patent No.: US 12,717,830 B2
(45) Date of Patent: Aug. 25, 2026

(54) COMPRESSING INFORMATION PROVIDED TO A MACHINE-TRAINED GENERATIVE MODEL

(71) Applicant: Microsoft Technology Licensing, LLC, Redmond, WA (US)

(72) Inventors: Lesly Sadiht Miculicich Werlen, Kirkland, WA (US); Pengcheng He, Sammamish, WA (US); Yujia Xie, Redmond, WA (US); Wei Xiong, Bellevue, WA (US); Siqing Chen, Bellevue, WA (US); Xun Wang, Amherst, MA (US); Elsie Prasuna Nallipogu, Bellevue, WA (US); Yanling Xiong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 18/225,071

(22) Filed: Jul. 21, 2023

(65) Prior Publication Data

US 2025/0028750 A1 Jan. 23, 2025

(51) Int. Cl.
*G06F 40/284* (2020.01)
*G06F 16/3329* (2025.01)
*G06F 16/34* (2019.01)

(52) U.S. Cl.
CPC .......... *G06F 16/345* (2019.01); *G06F 40/284* (2020.01)

(58) Field of Classification Search
CPC ... G06F 16/345; G06F 40/284; G06F 16/3329
See application file for complete search history.

(56) References Cited

U.S. PATENT DOCUMENTS 11,222,165 B1 * 1/2022 Ramos .................. G06F 40/279
11,934,432 B2 * 3/2024 Landry .................. G06F 40/30

(Continued)

FOREIGN PATENT DOCUMENTS

WO WO-2023124647 A1 * 7/2023 ............. G10L 15/26

OTHER PUBLICATIONS

Xu, Sheng, Xingfa Shen, Fumiyo Fukumoto, Jiyi Li, Yoshimi Suzuki, and Hiromitsu Nishizaki. 2020. "Paraphrase Identification with Lexical, Syntactic and Sentential Encodings" Applied Sciences 10, No. 12: 4144. https://doi.org/10.3390/app10124144 (Year: 2020).*

(Continued)

*Primary Examiner* — Paras D Shah
*Assistant Examiner* — Mulugeta Tuji Dugda

(57) ABSTRACT

A technique is described for compressing input information fed to a machine-trained generative model. The technique includes: receiving original input information having a plurality of sentences; performing word-level encoding of the original input information using a first part of a machine-trained transformer model, to provide word-level encoded information; performing sentence-level encoding of the word-level encoded information using a second part of the machine-trained transformer model, to provide scores associated with the first plurality of sentences; selecting a subset of the sentences in the original input information based on the scores, to provide modified input information; and providing the modified input information to the machine-trained generative model. The operation of word-level encoding performs parallel processing on portions of the original input information. Overall, the compressing operation enables the machine-trained generative model to process the original input information with reduced resources and latency.

17 Claims, 10 Drawing Sheets

(56) References Cited

U.S. PATENT DOCUMENTS

| | | | | |
|---|---|---|---|---|
| 2021/0217408 | A1 | 7/2021 | Hakkani-Tur et al. | |
| 2021/0350229 | A1* | 11/2021 | Saleh | G06F 40/56 |
| 2022/0094649 | A1* | 3/2022 | Le | G06F 40/35 |
| 2023/0320642 | A1* | 10/2023 | Lin | G06F 40/30 |
| 2024/0135611 | A1* | 4/2024 | Costin | G06T 11/60 |
| 2024/0386214 | A1* | 11/2024 | Ghoche | G06Q 30/015 |
| 2025/0021468 | A1* | 1/2025 | Gao | G06F 40/20 |
| 2025/0061280 | A1* | 2/2025 | Yan | G06F 40/30 |

OTHER PUBLICATIONS

International Search Report and Written Opinion for PCT Application No. PCT/US2024/036293, mailing date Oct. 14, 2024, 13 pages.

Wingate, et al., "Prompt Compression and Contrastive Conditioning for Controllability and Toxicity Reduction in Language Models," in Findings of the Association for Computational Linguistics: EMNLP 2022, Dec. 2022, pp. 5621-5634.

Wingate, et al., "Prompt Compression and Contrastive Conditioning for Controllability and Toxicity Reduction in Language Models," arXiv, 2210.03162v1 [cs.CL], Oct. 6, 2022, 14 pages.

Devlin, et al., "BERT: Pre-training of Deep Bidirectional Transformers for Language Understanding," arXiv, Cornell University, arXiv:1810.04805v2 [cs.CL], May 24, 2019, 16 pages.

Scao, et al., "Bloom: A 176B-Parameter Open-Access Multilingual Language Model," arXiv, Cornell University, arXiv:2211.05100v2 [cs.CL], Dec. 11, 2022, 62 pages.

Zhao, et al., "Topic Modelling Meets Deep Neural Networks: A Survey," arXiv, Cornell University, arXiv:2103.00498v1 [cs.LG], Feb. 28, 2021, 8 pages.

Dong, Yue, "A Survey on Neural Network-Based Summarization Methods," arXiv, Cornell University, arXiv:1804.04589v1 [cs.CL], Mar. 19, 2018, 16 pages.

Vaswani, et al., "Attention Is All You Need," in 31st Conference on Neural Information Processing Systems (NIPS 2017), 2017, 11 pages.

Shuster, et al., "Retrieval Augmentation Reduces Hallucination in Conversation," arXiv, Cornell University, arXiv:2104.07567v1 [cs.CL], Apr. 15, 2021, 21 pages.

Madaan, et al., "MemPrompt: Memory-assisted Prompt Editing with User Feedback," arXiv, Cornell University, arXiv:2201.06009v7 [cs.CL], Feb. 18, 2023, 30 pages.

Zong, et al., "Training Language Models with Memory Augmentation," arXiv, Cornell University, arXiv:2205.12674v3 [cs.CL], Nov. 29, 2022, 17 pages.

Peng, et al., "Check Your Facts and Try Again: Improving Large Language Models with External Knowledge and Automated Feedback," arXiv, Cornell University, arXiv:2302.12813v3 [cs.CL], Mar. 8, 2023, 15 pages.

Brown, et al., "Language Models are Few-Shot Learners," arXiv, Cornell University, arXiv:2005.14165v4 [cs.CL], Jul. 22, 2020, 75 pages.

"Introducing the World's Largest Open Multilingual Language Model: BLOOM," available at https://bigscience.huggingface.co/blog/bloom, Big Science Blog, accessed on Feb. 13, 2023, 2 pages.

Hsu, et al., "A Unified Model for Extractive and Abstractive Summarization using Inconsistency Loss," in Proceedings of the 56th Annual Meeting of the Association for Computational Linguistics (Long Papers), Jul. 2018, pp. 132-141.

Liu, et al., "Text Summarization with Pretrained Encoders," in Proceedings of the 2019 Conference on Empirical Methods in Natural Language Processing and the 9th International Joint Conference on Natural Language Processing, Nov. 2019, pp. 3730-3740.

Goyal, et al., "News Summarization and Evaluation in the Era of GPT-3," arXiv, Cornell University, bfarXiv:2209.12356v2 [cs.CL], May 23, 2023, 20 pages.

Huang, et al., "An Extraction-Abstraction Hybrid Approach for Long Document Summarization," in 2019 6th International Conference on Behavioral, Economic and Socio-Cultural Computing (BESC), 2019, 6 pages.

Shinde, et al., "An Extractive-Abstractive Approach for Multi-document Summarization of Scientific Articles for Literature Review," in Proceedings of the Third Workshop on Scholarly Document Processing, Oct. 2022, pp. 204-209.

Pathak, et al., "Constructing Prompt Information for Submission to a Language Model by Dynamically Selecting from Context Information," U.S. Appl. No. 18/211,573, filed Jun. 19, 2023, 82 pages.

Pathak, et al., "Constructing Prompt Information for Submission to a Language Model by Dynamically Compressing Source Information," U.S. Appl. No. 18/211,577, filed Jun. 19, 2023, 79 pages.

Peng, et al., "Interacting with a Language Model using External Knowledge and Feedback," U.S. Appl. No. 18/140,658, flied Apr. 28, 2023, 68 pages.

Zhou, et al., "Neural Document Summarization by Jointly Learning to Score and Select Sentences," arXiv, Cornell University, arXiv:1807.02305v1 [cs.CL], Jul. 6, 2018, 10 pages.

Gupta, "Compression of Deep Learning Models for Text: A Survey," arXiv, arXiv:2008.05221v4 [cs.CL], Jun. 13, 2021, 53 pages.

Chen, et al., "Stabilized In-Context Learning with Pre-trained Language Models for Few Shot Dialogue State Tracking," arXiv, arXiv:2302.05932v1 [cs.CL], Feb. 12, 2023, 14 pages.

Santra, et al., "Frugal Prompting for Dialog Models," arXiv, arXiv:2305.14919v1 [cs.CL], May 24, 2023, 22 pages.

* cited by examiner

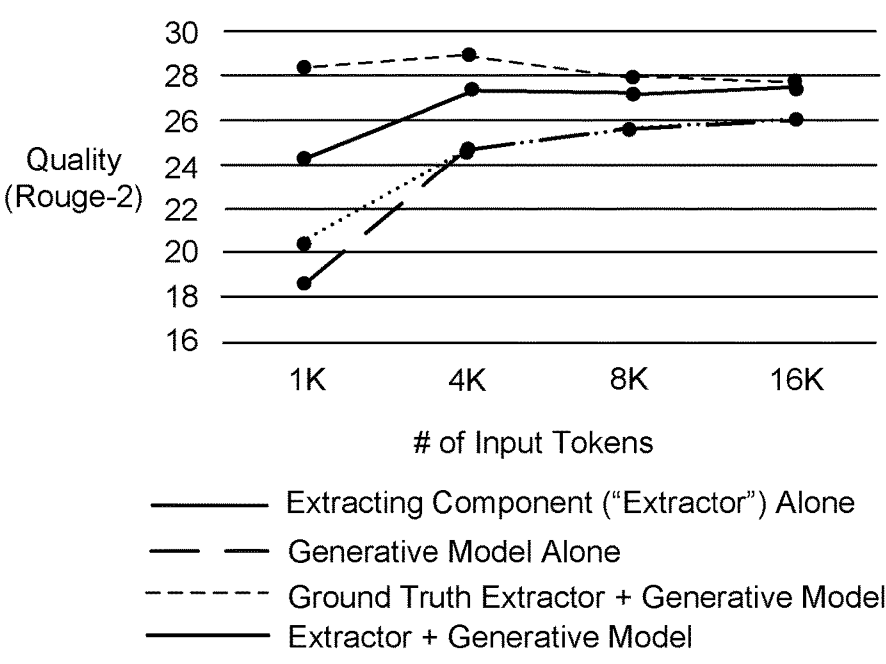
FIG. 6
| Input Length (to Generative Model) | Generative Model Alone | | Extractor + Generative Model | |
|---|---|---|---|---|
| | Latency (sec) | Quality (R2) | Latency (sec) | Quality (R2) |
| 2K | 3.6 | 22.0 | 4.0 | 26.7 |
| 8K | 7.6 | 27.0 | 4.0 | 27.3 |
FIG. 7
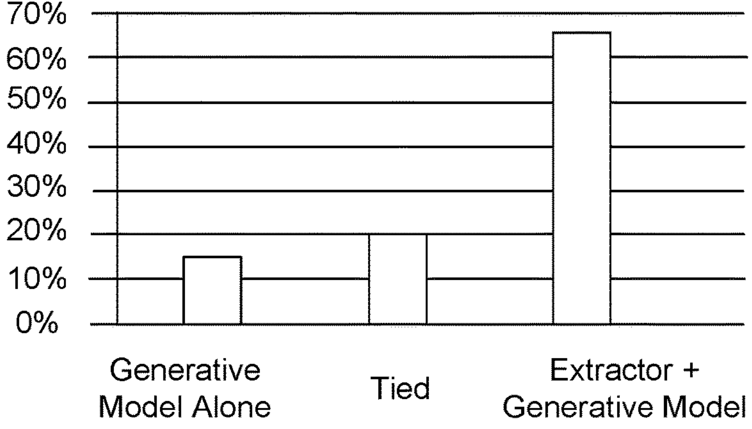
FIG. 8

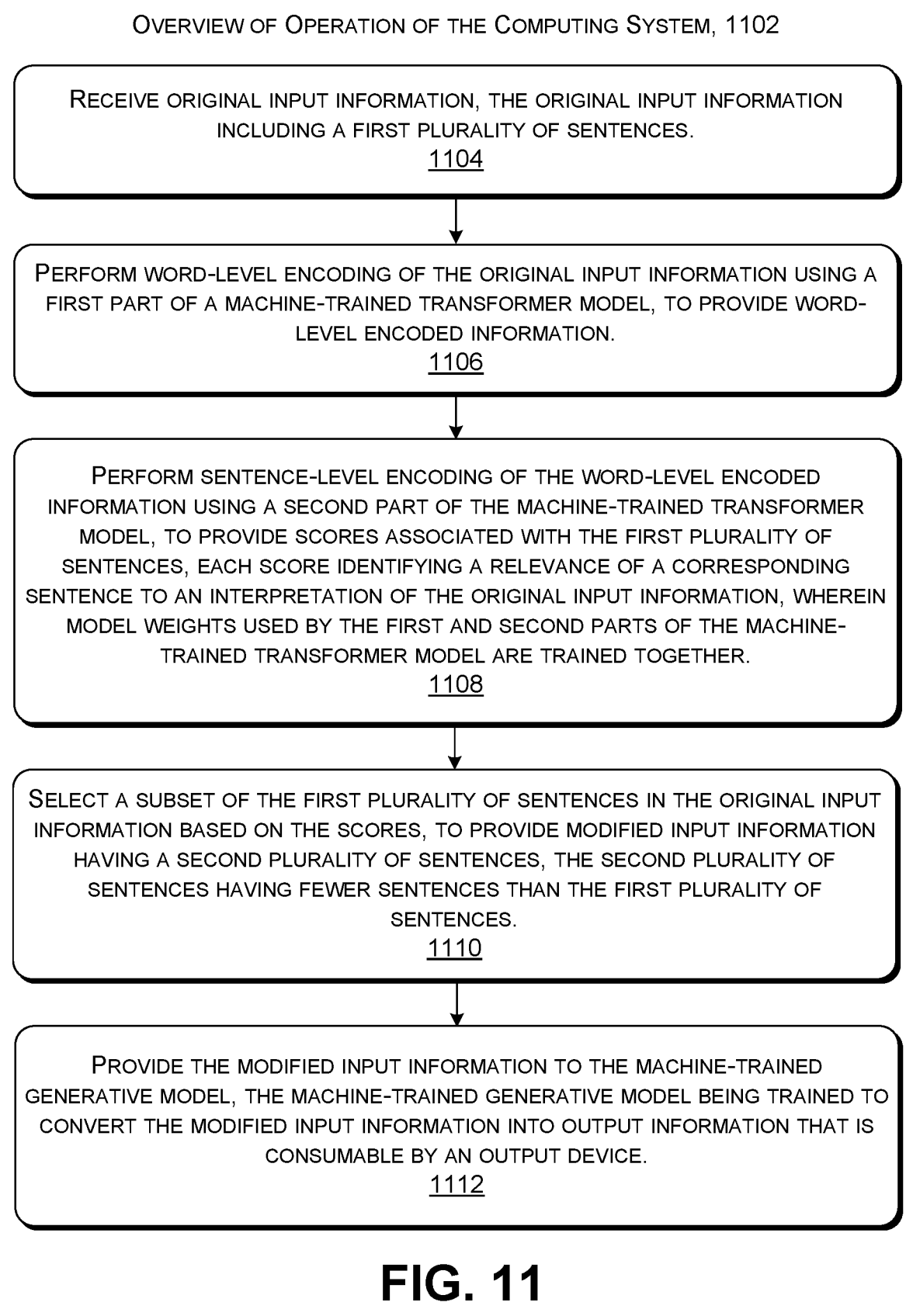

OVERVIEW OF OPERATION OF THE COMPUTING SYSTEM, 1102

RECEIVE ORIGINAL INPUT INFORMATION, THE ORIGINAL INPUT INFORMATION INCLUDING A FIRST PLURALITY OF SENTENCES.
1104

PERFORM WORD-LEVEL ENCODING OF THE ORIGINAL INPUT INFORMATION USING A FIRST PART OF A MACHINE-TRAINED TRANSFORMER MODEL, TO PROVIDE WORD-LEVEL ENCODED INFORMATION.
1106

PERFORM SENTENCE-LEVEL ENCODING OF THE WORD-LEVEL ENCODED INFORMATION USING A SECOND PART OF THE MACHINE-TRAINED TRANSFORMER MODEL, TO PROVIDE SCORES ASSOCIATED WITH THE FIRST PLURALITY OF SENTENCES, EACH SCORE IDENTIFYING A RELEVANCE OF A CORRESPONDING SENTENCE TO AN INTERPRETATION OF THE ORIGINAL INPUT INFORMATION, WHEREIN MODEL WEIGHTS USED BY THE FIRST AND SECOND PARTS OF THE MACHINE-TRAINED TRANSFORMER MODEL ARE TRAINED TOGETHER.
1108

SELECT A SUBSET OF THE FIRST PLURALITY OF SENTENCES IN THE ORIGINAL INPUT INFORMATION BASED ON THE SCORES, TO PROVIDE MODIFIED INPUT INFORMATION HAVING A SECOND PLURALITY OF SENTENCES, THE SECOND PLURALITY OF SENTENCES HAVING FEWER SENTENCES THAN THE FIRST PLURALITY OF SENTENCES.
1110

PROVIDE THE MODIFIED INPUT INFORMATION TO THE MACHINE-TRAINED GENERATIVE MODEL, THE MACHINE-TRAINED GENERATIVE MODEL BEING TRAINED TO CONVERT THE MODIFIED INPUT INFORMATION INTO OUTPUT INFORMATION THAT IS CONSUMABLE BY AN OUTPUT DEVICE.
1112

FIG. 11

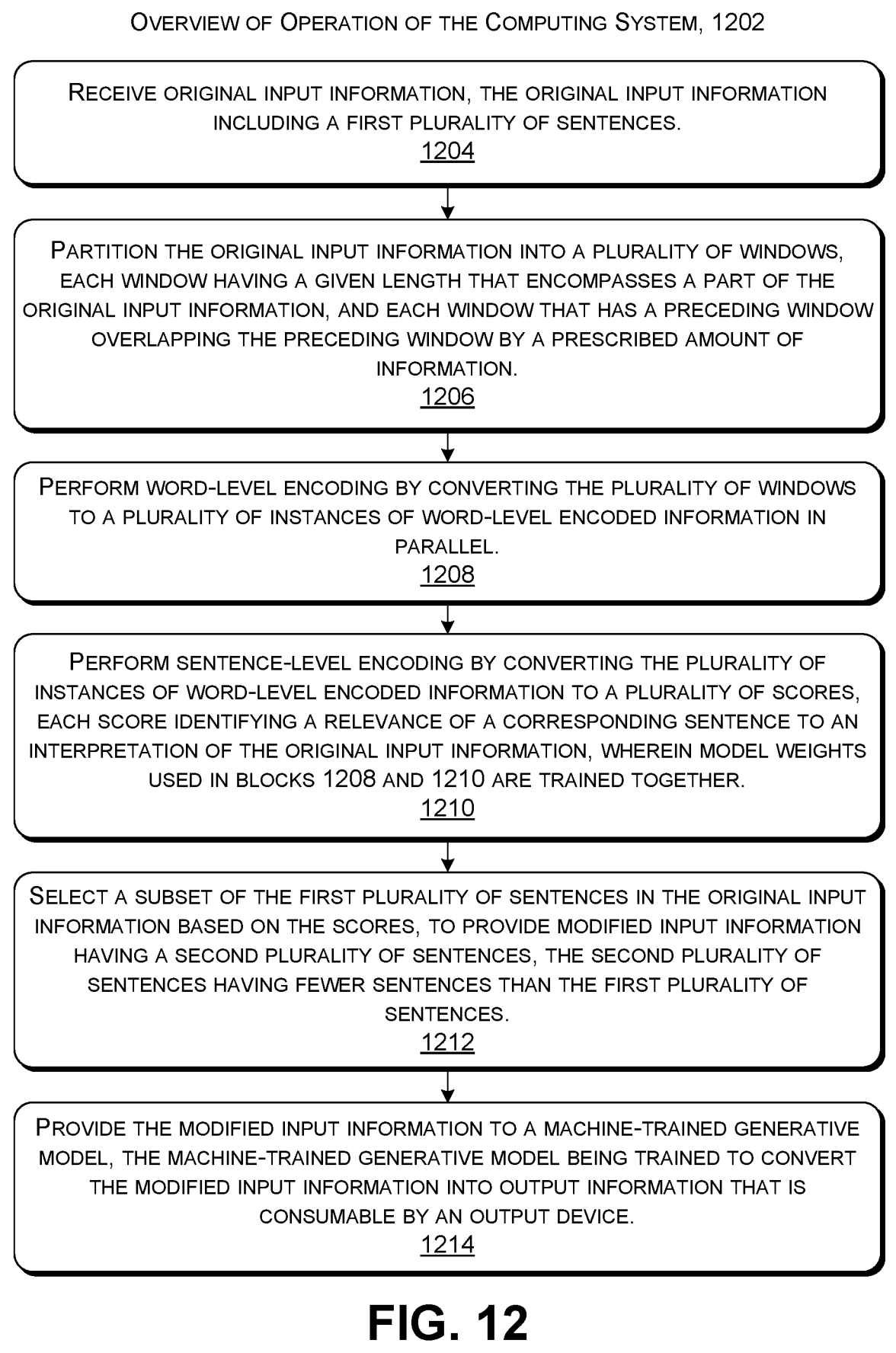

OVERVIEW OF OPERATION OF THE COMPUTING SYSTEM, 1202

RECEIVE ORIGINAL INPUT INFORMATION, THE ORIGINAL INPUT INFORMATION INCLUDING A FIRST PLURALITY OF SENTENCES.
1204

PARTITION THE ORIGINAL INPUT INFORMATION INTO A PLURALITY OF WINDOWS, EACH WINDOW HAVING A GIVEN LENGTH THAT ENCOMPASSES A PART OF THE ORIGINAL INPUT INFORMATION, AND EACH WINDOW THAT HAS A PRECEDING WINDOW OVERLAPPING THE PRECEDING WINDOW BY A PRESCRIBED AMOUNT OF INFORMATION.
1206

PERFORM WORD-LEVEL ENCODING BY CONVERTING THE PLURALITY OF WINDOWS TO A PLURALITY OF INSTANCES OF WORD-LEVEL ENCODED INFORMATION IN PARALLEL.
1208

PERFORM SENTENCE-LEVEL ENCODING BY CONVERTING THE PLURALITY OF INSTANCES OF WORD-LEVEL ENCODED INFORMATION TO A PLURALITY OF SCORES, EACH SCORE IDENTIFYING A RELEVANCE OF A CORRESPONDING SENTENCE TO AN INTERPRETATION OF THE ORIGINAL INPUT INFORMATION, WHEREIN MODEL WEIGHTS USED IN BLOCKS 1208 AND 1210 ARE TRAINED TOGETHER.
1210

SELECT A SUBSET OF THE FIRST PLURALITY OF SENTENCES IN THE ORIGINAL INPUT INFORMATION BASED ON THE SCORES, TO PROVIDE MODIFIED INPUT INFORMATION HAVING A SECOND PLURALITY OF SENTENCES, THE SECOND PLURALITY OF SENTENCES HAVING FEWER SENTENCES THAN THE FIRST PLURALITY OF SENTENCES.
1212

PROVIDE THE MODIFIED INPUT INFORMATION TO A MACHINE-TRAINED GENERATIVE MODEL, THE MACHINE-TRAINED GENERATIVE MODEL BEING TRAINED TO CONVERT THE MODIFIED INPUT INFORMATION INTO OUTPUT INFORMATION THAT IS CONSUMABLE BY AN OUTPUT DEVICE.
1214

FIG. 12

COMPRESSING INFORMATION PROVIDED TO A MACHINE-TRAINED GENERATIVE MODEL

BACKGROUND

A generative artificial intelligence (AI) model includes machine-trained weights that express patterns in a large corpus of training data. The generative model leverages the patterns to convert input information into new information. A chat engine, for example, can use a generative model to synthesize an answer, given an input question. The answer does not necessarily have any direct counterpart in the training data used to train the chat engine.

An increasing number of applications incorporate generative models. However, this type of technology is resource-intensive in nature. Further, generative models often require a significant amount of time to deliver their output information. Some applications address these issues by limiting the amount of input information that can be fed to a generative model at any one time. For example, a chat engine can limit the size of a prompt that is fed to the chat engine to a prescribed number of tokens. In some cases, these types of provisions compromise the quality of output information produced by the generative model.

SUMMARY

A technique is described for compressing input information fed to a machine-trained generative model. The operation of compressing enables the generative model to process the input information with reduced resources and latency, compared to the case in which the input information has not been compressed. At the same time, the operation of compressing does not negatively impact the quality of output results provided by the generative model.

In some implementations, the technique includes an extractive summarization phase which converts original input information to modified input information. The modified input information has a smaller size than the original input information. The technique then supplies the modified input information to the generative model instead of the original input information.

The extractive summarization stage itself has three parts. In a first part, the technique performs word-level encoding of the original input information using a first part of a machine-trained transformer model, to provide word-level encoded information. In a second part, the technique performs sentence-level encoding of the word-level encoded information using a second part of the machine-trained transformer model, to provide scores associated with the sentences in the original input information. Each score identifies a relevance of a corresponding sentence to the interpretation of the original input information as a whole. In a third part, the technique selects a subset of the first plurality of sentences in the original input information based on the scores, to provide the modified input information. The modified input information has fewer sentences than the original input information.

In some implementations, the technique further includes partitioning the original input information into a plurality of overlapping windows. After tokenizing the original input information 104, the windows include classification tokens that designate respective sentences in the windows. The operation of word-level encoding includes converting the classification tokens into classification embeddings. The operation of sentence-level encoding includes converting the plurality of classification embeddings into the scores associated with the sentences in the original input information.

In some implementations, the operation of selecting includes choosing a group of sentences in the original input information that have scores that satisfy a prescribed selection criterion, while keeping within the input size constraint of the generative model. The operation of selecting then includes ordering sentences in the group of sentences according to an order in which the sentences appear in the original input information.

In some implementations, the generative model performs abstractive summarization of the modified input information to reduce a size of the modified input information. The abstractive summarization involves changing a wording of at least one sentence in the modified input information. In other cases, the generative model is a chat engine, question-answering engine, or reading comprehension engine.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 is a graph that shows quality of output information generated by the computing system of FIG. 1, compared to competing techniques.

FIG. 7 is a table that shows quality of output information and latency-related performance provided by the computing system of FIG. 1, compared to a competing technique.

FIG. 8 is a bar graph that shows an outcome of human evaluation of output information generated by the computing system of FIG. 1, compared to a competing technique.

FIGS. 11-13 show three different processes that explain the operation of the computing system of FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

A. Overview of an Illustrative Computing System

Figure 1:
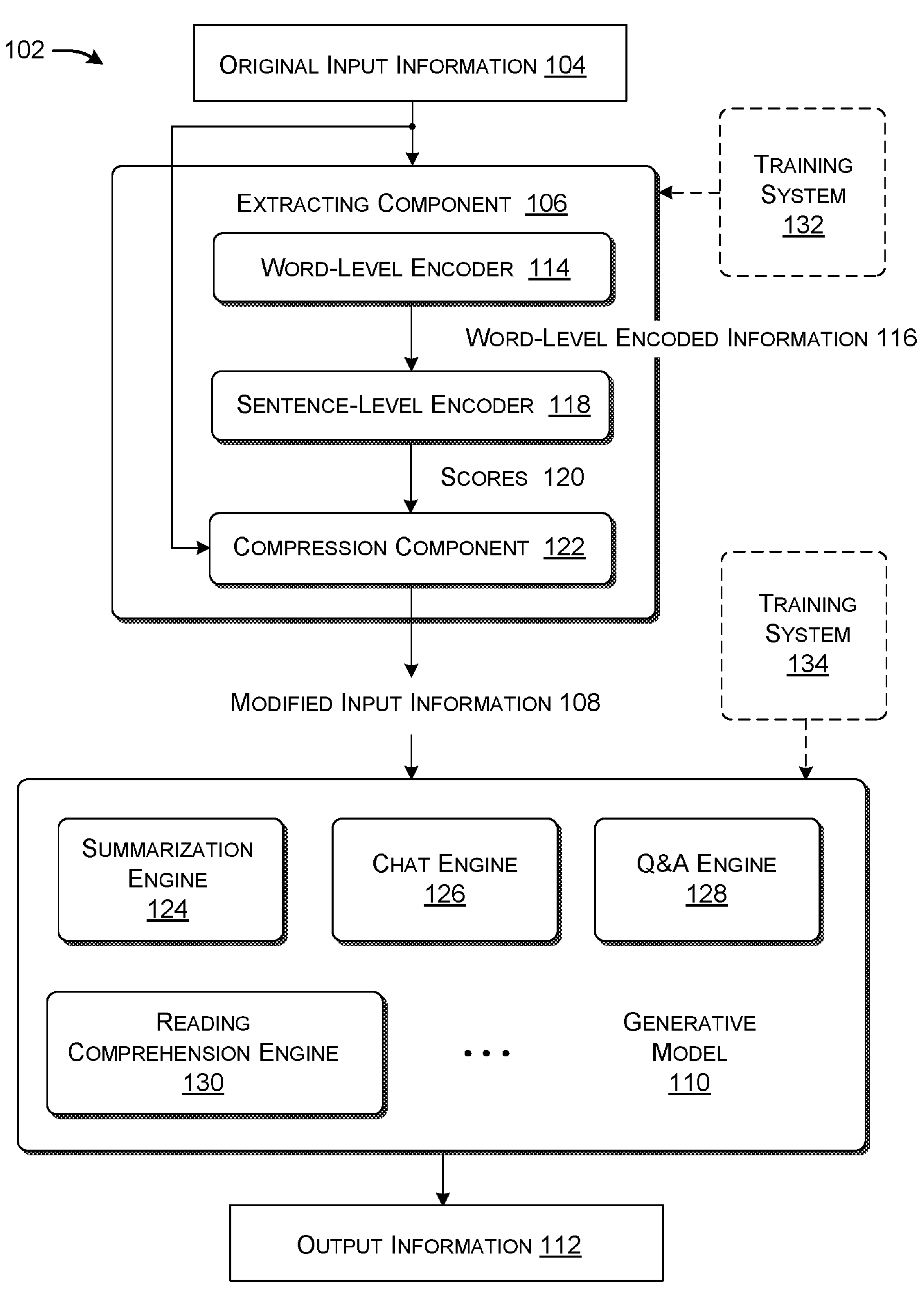
FIG. 1 shows a computing system that uses an extracting component to compress original input information into modified input information. The computing system feeds the modified input information into a machine-trained generative model.

FIG. 1 shows a computing system 102 that processes original input information 104 in two stages. In a first stage, an extracting component 106 compresses the original input information 104 into modified input information 108. The original input information 104 includes a first plurality of sentences, and the modified input information 108 includes a second plurality of sentences. The second plurality of sentences has fewer sentences than the first plurality of sentences. In a second stage, a machine-trained generative model 110 ("generative model" hereafter) converts the modified input information to output information 112, e.g., using the transformation operations described with reference to FIG. 10.

The compression performed by the extracting component 106 has the following illustrative technical effects. First, the computing system 102 processes the original input information 104 using fewer resources compared to the case in which the original input information 104 is not compressed. The resources include processing-related resources (including Central Processing Unit resources and Graphics Processing Unit resources, etc.), memory resources, communication-related resources, power, etc. For example, memory consumption at inference time varies with input length (defining the size of input to the generative model 110) in the following manner (with respect to a processing platform that uses NDv2 accelerators provided by Nvidia Corporation of Santa Clara, California): an input length of 2K uses 2.6 GB of memory per GPU, an input length of 4K uses 15.6 GB of memory per GPU, and an input length of 8K uses 28.2 GB per GPU. Second, the computing system 102 processes the original input information 104 in less time compared to the case in which the original input information is not compressed. Third, in some cases, the compression performed by the extracting component 106 has the effect of improving the quality of the output information 112 generated by the generative model 110. In other cases, the compression does not at least significantly degrade the quality of the output information 112.

The first and second effects follow from the fact that decreasing the amount of input information fed to the generative model 110 reduces the amount of processing operations it is asked to perform (compared to the case in which the generative model 110 directly processes the original input information 104). Decreasing the amount of processing operations, in turn, reduces the amount of resources consumed by the generative model 110 in processing the original input information 104. Decreasing the amount of processing operations also shortens the amount of time that is necessary to process the input information. Further, some implementations of the extracting component 106 process portions of the original input information 104 in parallel. This provision further reduces latency in the operation of the computing system 102 as a whole.

The third effect follows from the fact that the extracting component 106 removes less relevant sentences from the original input information 104. This reduces the risk that the generative model 110 is led astray by the presence of irrelevant sentences in the original input information 104. Further note that the extracting component 106 selects sentences but does not otherwise change their wording. This has the effect of preserving the meaning of the chosen sentences. The computing system 102 specifically provides higher quality results compared to an alternative technique that involves selecting a most recent part of the original input information 104 (such as the most current part of a dialogue that was lasted entered), where this part has a size specified by an input size constraint of the generative model 110. This alternative approach runs the risk of eliminating relevant sentences in the original input information 104 that occur after the point at which the original input information 104 is truncated.

Figure 14:
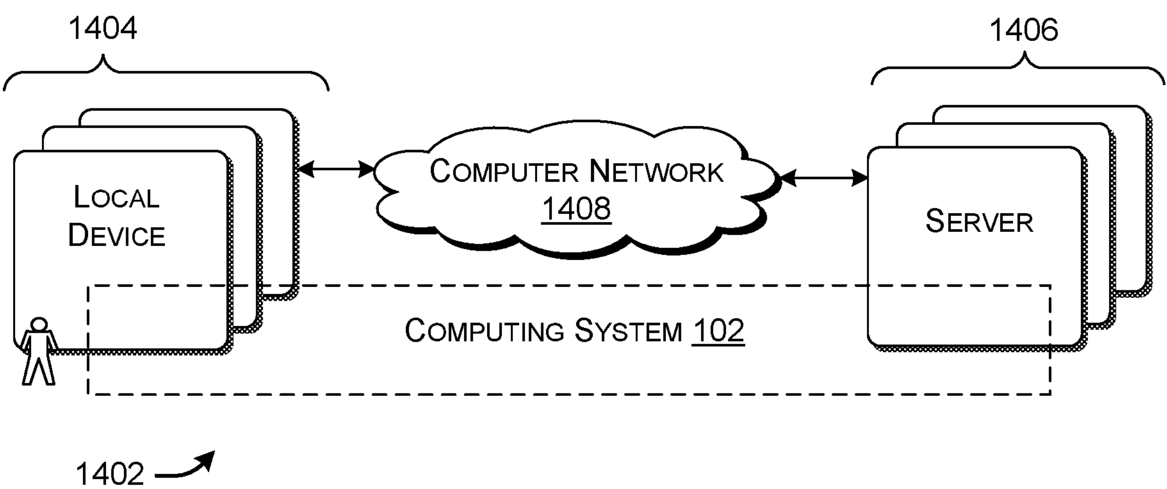
FIG. 14 shows computing equipment that, in some implementations, is used to implement the computing system of FIG. 1.
Figure 15:
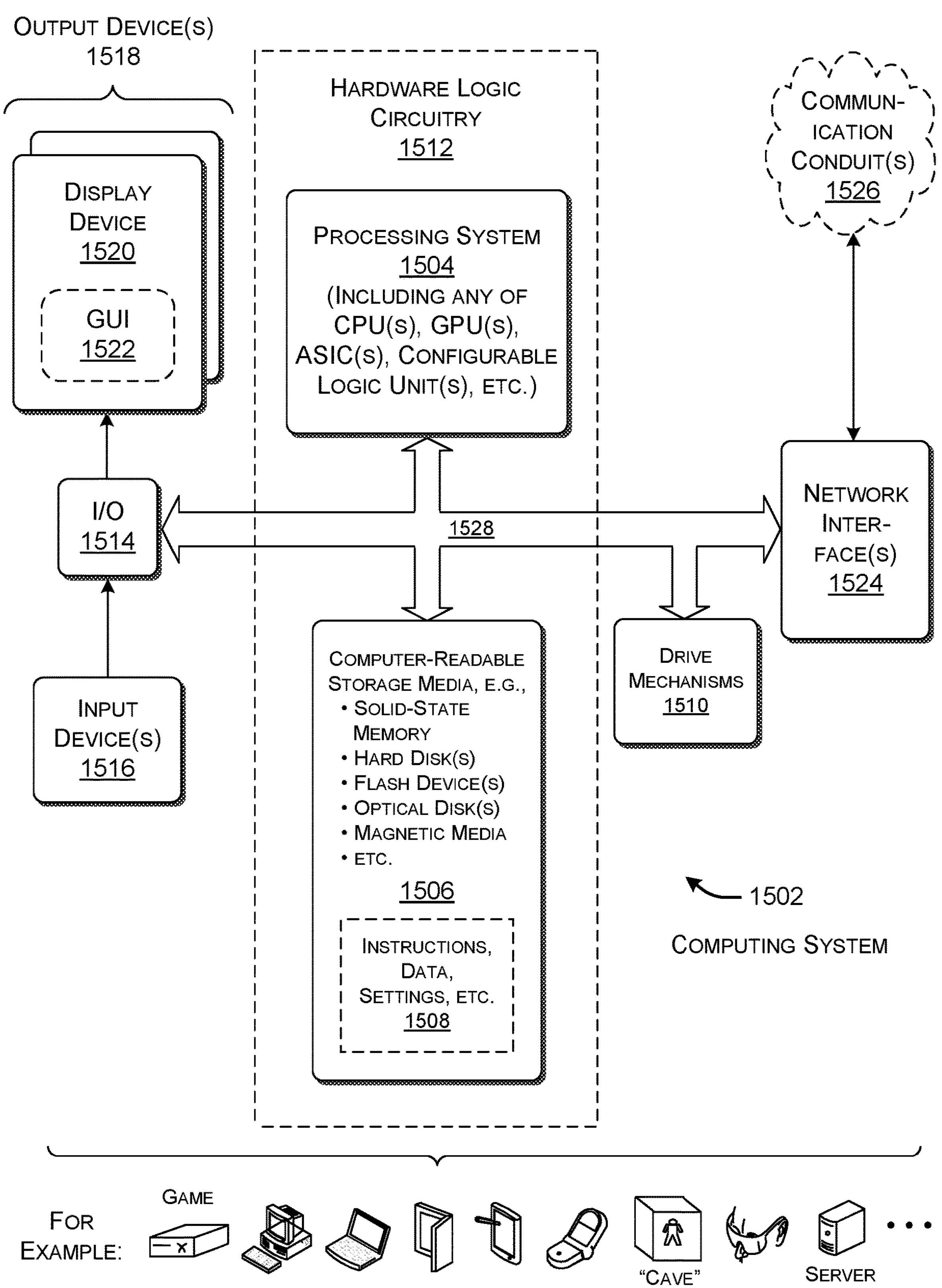
FIG. 15 shows an illustrative type of computing system that, in some implementations, is used to implement any aspect of the features shown in the foregoing drawings.

By way of terminology, as used herein, a "machine-trained model" refers to computer-implemented logic for executing a task using machine-trained weights that are produced in a training operation. A "weight" refers to any type of parameter value that is iteratively produced by the training operation. In some contexts, terms such as "component," "module," "engine," and "tool" refer to parts of computer-based technology that perform respective functions. FIGS. 14 and 15, described below, provide examples of illustrative computing equipment for performing these functions.

A "token" or "content unit" refers to a unit of linguistic information (including a word, a part of a word, a phrase, etc.) and/or a unit of any other type of information (such as image information). A "token" specifically refers to a unit of information processed by a machine-trained model. For example, in some implementations, a machine-trained model includes a tokenizer that breaks a received linguistic passage into a sequence of units referred to as tokens, and thereafter processes the tokens using machine-trained logic. A "content unit" is used to refer to a portion of information in other contexts. "Information" refers to any content that is expressible in any manner, and does not imply any specific form of expression. A "sentence" is a grouping of words, and is intended to encompass both complete sentences (each of which includes both a subject and a verb) and incomplete sentences (each of which does not necessarily include both a subject and a verb). A synonym of "sentence" is "word grouping," and each occurrence of "sentence" herein can be replaced by "word grouping."

In some implementations, the machine-trained models described herein are language models that process text-based tokens. In other implementations, the machine-trained models are multi-modal in nature, and are capable of processing any type, or combination of types, of tokens. For example, in some implementations, the machine-trained models process input information that includes any combination of language-based tokens, video-based tokens, image-based tokens, audio-based tokens, etc. To facilitate explanation, however, the following explanation presents examples in which the machine-trained models process text-based tokens.

The extracting component 106 performs its processing in three stages. In a first stage, a word-level encoder 114 uses a first part of a machine-trained transformer model to convert the original input information 104 to word-level encoded information 116. In a second stage, a sentence-level encoder 118 uses a second part of the machine-trained transformer model to convert the word-level encoded information 116 to a plurality of scores 120. Each score measures the relevance of a corresponding sentence to the interpretation of the original input information 104 as a whole. In a third stage, a compression component 122 uses the scores 120 to select a group of sentences in the original input information 104. The group has fewer sentences than the original input information 104. The group of chosen sentences makes up the modified input information 108.

Figure 9:
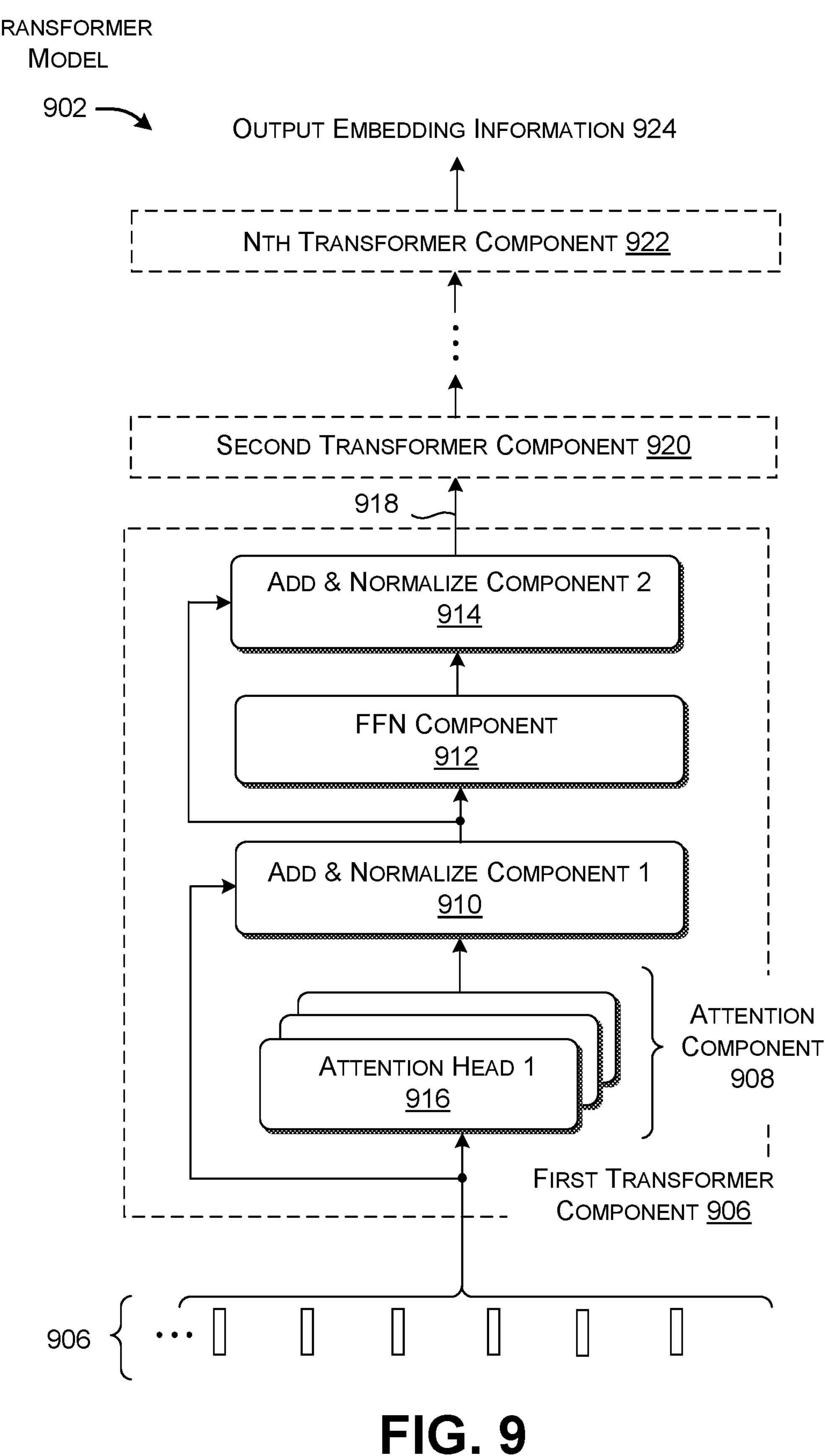
FIG. 9 shows an example of transformer model used by the extracting component of FIG. 1.

In some examples, the transformer model referenced above is implemented using the transformer architecture shown in FIG. 9. As one prominent feature, the transformer model includes one or more attention components. As will be described below, each attention component processes input embedding information by assessing the relevance of each part of the input embedding information to the interpretation of each other part of the input embedding information (and to the same part of the input embedding information). Other implementations of the machine-trained models that can be used in the encoding component 114 include a convolutional neural network (CNN) model, a recurrent neural network (RNN) model, a fully-connected feed-forward neural network (FFN) model, and so on, a stable diffusion model, or any combination thereof. A training system 132 trains the transformer model to perform its functions, as will be described in Section C.

The generative model 110 processes the modified input information 104 in different ways in different implementations. In some examples, the generative model 110 constitutes any of an abstractive summarization engine 124, a chat engine 126, a question-and-answer (Q&A) engine 128, a reading comprehension engine 130, etc. In other implementations, the generative model 110 performs the functions of two or more of the above-identified engines.

The abstractive summarization engine 124 provides a summary of the modified input information 108 which further compresses the modified input information 108. In doing so, the abstractive summarization engine 124 changes the wording of at least one sentence in the modified input information 108. The chat engine 126 engages in a dialogue with a user over one or more dialogue turns. In each dialogue turn, the chat engine 126 converts the modified input information 108 into a text-based response. The Q&A engine 128 provides an answer to a question posed in the modified input information 108. The reading comprehension engine 130 also provides an answer to a question posed in the modified input information 108. Here, the question specifically asks the reading comprehension engine 130 to provide its answer by interpreting a specified body of text. For example, a question posed to the reading comprehension engine 130 might ask: "What is the date on which Project ABC will launch, as stated in the Email thread <TeamRedmond>, where "Project ABC" is a specific project within a company, and "TeamRedmond" is a particular collection of Emails exchanged by employees of the company.

The output information 112 produced by the generative model 110 is post-processed in an application-specific manner. In the case of the chat engine 126, the Q&A engine 128, and the reading comprehension engine 130, the output information 112 represents a response to a query that is presented to the user in any manner via any output device. In the case of the abstractive summarization engine 124, the output information 112 can be processed in a variety of ways, including: a) presenting the output information 112 to the user via any output device; b) sending the output information 112 to the chat engine 126, Q&A engine 128, or reading comprehension engine 130; c) editing a document based on the output information 112; d) storing the output information 112 on a storage device; e) processing the output information 112 using another downstream machine-trained model (not shown), so on. The output information 112 can be generally be said to be directly or indirectly consumable by an output device (including a display device, a speaker, a storage device, etc.).

In some implementations, the generative model 110 receives the modified input information 108, without alteration thereof. In other implementations, the extracting component 106 prepares prompt information that includes the modified input information 108 together with other information. For example, the prompt information can prepend information to the modified input information 108 that provides an instruction to the generative model 110 regarding the function it is expected to perform.

Figure 10:
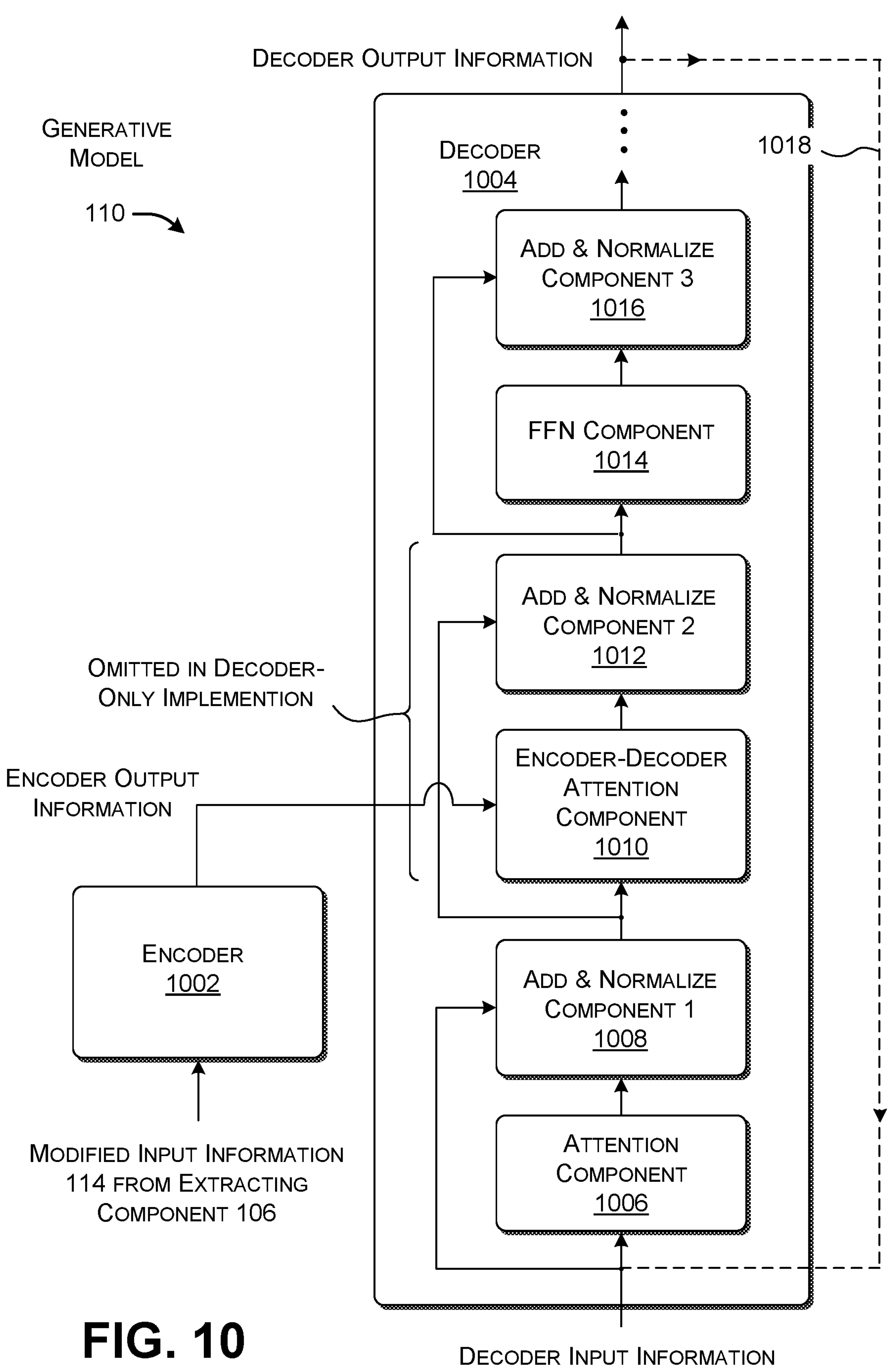
FIG. 10 shows one implementation of the machine-trained generative model used in the computing system of FIG. 1.

In some implementations, the generative model 110 is implemented using the encoder-decoder architecture shown in FIG. 10, or a decoder-only implementation. The encoder-decoder architecture, in turn, uses the transformer model shown in FIG. 9. Other implementations of the generative model 110 use other machine-trained models, including a CNN model, an RNN model, a fully-connected FFN model, a stable diffusion model, and so on, or any combination thereof. A training system 134 trains the generative model 110 to perform any of the functions described above, as will be described in greater detail below in Section C.

In some implementations, a single entity implements both the extracting component 106 and the generative model 110 at one or more locations. In other implementations, a first entity implements the extracting component 106 and a second entity implements the generative model 110. For example, the second entity may provide an application programming interface (API) by which the first entity is able to interact with the generative model 110. Section E below provides further information regarding possible implementations of the computing system 102.

In either of the above implementations, the extracting component 106 is agnostic to whatever post-processing operations are performed by the generative model 110. This factor improves the flexibility and scalability of the computing system 102, and facilitates its maintenance. That is, the same extracting component 106 can be paired with any type of generative model 110 without requiring changes to the extracting component 106 or the generative model 110. One factor contributing to this flexibility is the fact that the extracting component 106 and the generative model 110 are trained separately, rather than as part of a same training operation. (However, it is also possible to train the extracting component 106 and the generative model 110 in a same training operation.)

Figure 2:
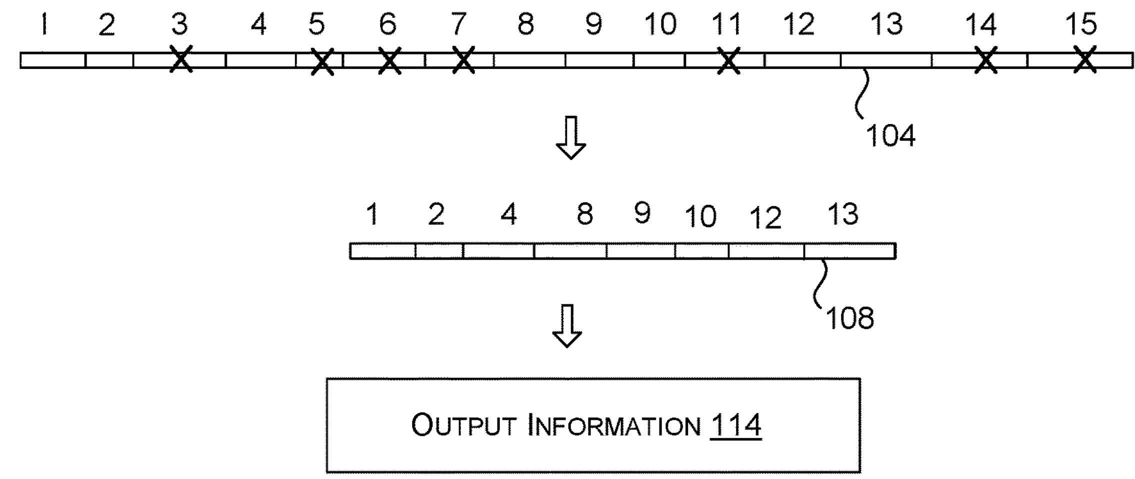
FIG. 2 shows an example of how the computing system of FIG. 1 compresses the original input information into the modified input information.

FIG. 2 provides further details regarding one implementation of the compression component 122. Assume, by way of example, that the original input information 104 includes the sequence of sentences shown in FIG. 2. Further assume that the generative model 110 accepts a maximum number of context units (e.g., words or word parts). For example, in one case the generative model 110 has an input size constraint of 2K content units (meaning that it will process no more than 2,000 content units in a single submission). In operation, the word-level encoder 114 converts the original input information into the word-level encoded information 116, and the sentence-level encoder 118 converts the word-level encoded information 116 into the scores 120. Each score identifies a level of relevance of an associated sentence to the interpretation of the original input information 104 as a whole. In other words, each score conveys the extent to which a sentence is useful in understanding the meaning of the original input information 104. In this particular example, the compression component 122 next selects eight of the sentences in the original input information 104 based on the scores 120, without otherwise modifying the sentences. The chosen eight sentences constitute the modified input information 104.

More specifically, in some implementations, the compression component 122 orders the sentences in the original input information 104 based on the scores 120, from most relevant to the least relevant (e.g., from highest to lowest). The compression component 122 then selects as many of the top-ranked sentences as it can without exceeding the input size constraint specified by the generative model 110. In more general terms, the compression component 122 selects a group of sentences that satisfy a prescribed suitability criterion. The suitability criterion in the above example is that the scores that are the selected are the most highly ranked among the entire group of scores. The compression component 122 then orders the group of chosen sentences so that they occur in the same order as original input information 104. For example, the compression component 122 places the fourth sentence after the second sentence because it occurs after the second sentence in the original input information 104.

In another implementation, the compression component 122 operates in the manner specified above, with the exception that it includes the first sentence of the original input information 104 in the modified input information 108, regardless of its score. Here, the compression component 122 still ensures that the entire group of sentences that it selects does not exceed the input size constraint of the generative model 110. The first sentence is useful to include in the modified input information 108 because it often provides useful context about the topic(s) discussed by the original input information 104.

The extracting component 106 provides a high-quality digest of the original input information 104, which, in turn, enables the generative model 110 to produce high-quality output information 112. This is because the extracting component 106 selects the sentences that are most effective in summarizing the meaning of the original input information 104. As stated, above, this approach is superior to the alternative technique of simply accepting a most current part of the original input information 104, up to the specified input size constraint of the generative model 110. Such a technique can exclude relevant information. Further, the extracting component 106 does not modify the selected sentences of the original input information 104. This provision reduces the risk that the meaning of the sentences will be corrupted.

Figure 3:
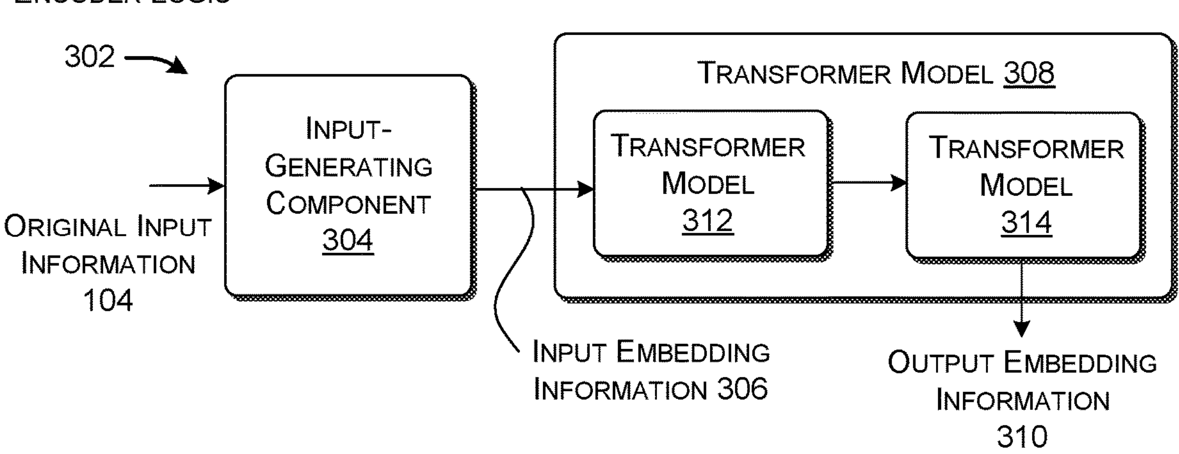
FIG. 3 shows encoder logic used by the extracting component of the computing system of FIG. 1.

FIG. 3 shows encoder logic 302 that implement the word-level encoder 114 and the sentence-level encoder 118. An input-generating component 304 generates input embedding information 306 based on the original input information 104. The embedding information includes a plurality of input embeddings (e.g., input embedding vectors). Transformer model 308 converts the input embedding information 306 into encoded information 310. The encoded information 310 includes a plurality of output embeddings (e.g., output embedding vectors). Generally, an embedding vector is a distributed vector that distributes its information over its k dimensions, rather than, as in a one-hot vector, allocating specific concepts to specific dimensions. An embedding vector represents the meaning of a sentence in a vector space. The distance between any two vectors in vector space reflects the extent which their underlying sentences express similar meanings. The transformer model 308 itself has two parts: a first transformer model 312 and a second transformer model 314. The description of FIG. 5 (below) will provide additional details regarding one implementation of the encoder logic 302. Further, as noted, FIG. 9 shows one implementation of the transformer model 308.

Figure 4:
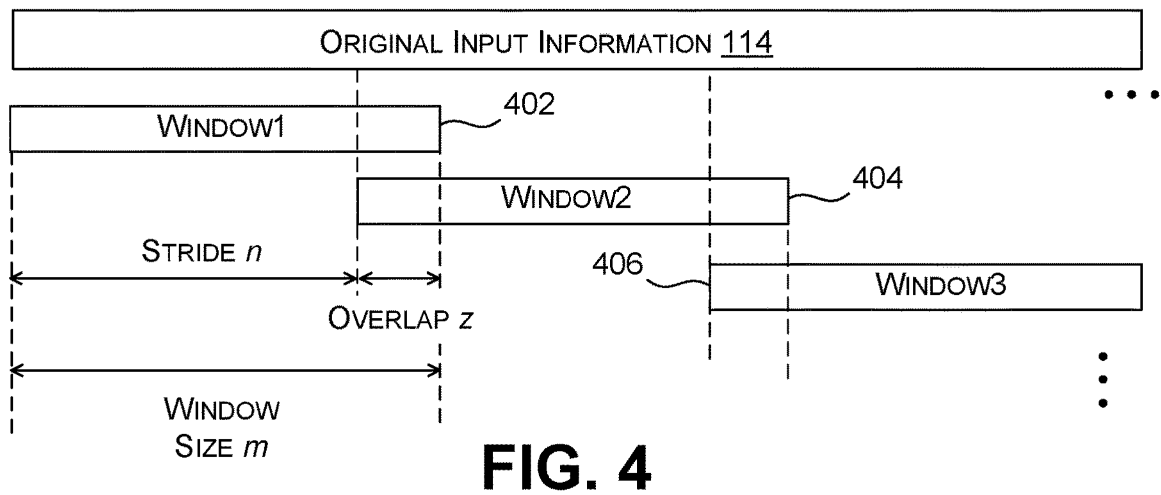
FIG. 4 shows an illustrative technique by which the extracting component of FIG. 1 partitions the original input information into a plurality of overlapping windows.
Figure 5:
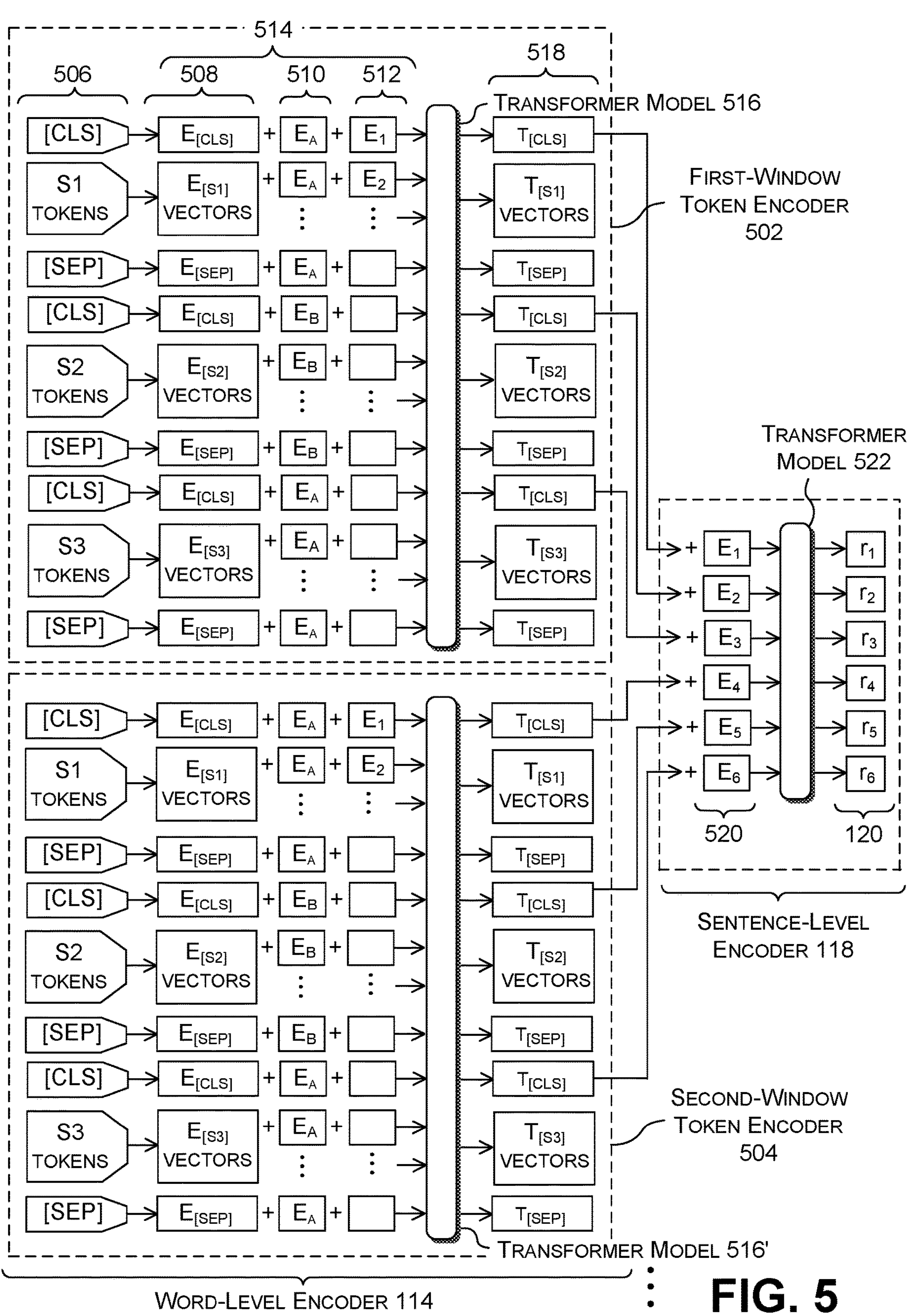
FIG. 5 shows one implementation of a word-level encoder and a sentence-level encoder, which are two parts of the encoding component of FIG. 1.

FIG. 4 shows one manner in which the word-level encoder 114 partitions the original input information 104 into two or more instances of input information. In this example, the operation of partitioning is described as occurring after tokenization, but it can alternatively occur before tokenization. In the example of FIG. 4, a first instance of input information is expressed in a first window 402. A second instance of input information is expressed in a second window 404. A third instance of input information is expressed in a third window 406. Each window has a size of m tokens. More generally stated, each window has a given length that encompasses a part of the original input information 104. Each window starts n tokens from the beginning of its preceding window, if any (where n<m). This span of n tokens defines the stride at which the window is moved across the original input information 104. Further, each window overlaps with its preceding window (if any) by z tokens. More generally stated, each window overlaps its preceding window by a predetermined amount of information (e.g., tokens). For example, the first window encompasses tokens content units 1 to m. The second window encompasses tokens n to n+m. The third window 406 encompasses 2n to 2n+m, and so on. While FIG. 4 shows only three windows, the word-level encoder 114 will continue to produce windows in the above-described manner until it reaches the end of the original input information 104. Although not shown in FIG. 3, further note that each window includes tokens associated with words (or word parts) in the original input information, as well as special tokens, such classification tokens ([CLS] tokens) and separator tokens ([SEP] tokens). FIG. 5 provides further information regarding the role that the special tokens play in the processing of the original input information 104.

In some implementations, the word-level encoder 114 processes the plural instances of input information in parallel using plural instances of processing resources (e.g., plural CPUs and/or plural GPUs). The word-level encoder 114 reduces the latency of the extracting component 106 by performing processing in parallel. As another advantage, the technique shown in FIG. 4 enables the extracting component 106 to process original input information 104 having any arbitrary length, including relatively long lengths. This factor further contributes to the flexibility and scalability of the computing system 102 as a whole.

FIG. 5 shows one implementation of the word-level encoder 114 and the sentence-level encoder 118, which have model weights that are trained together as part of a same training operation. This means that loss information produced in the training operation is back-propagated through both the word-level encoder 114 and the sentence-level encoder 118, and the weights of these components are updated in response thereto. FIG. 5 specifically shows the simplified case in which the word-level encoder 114 includes two units that operate in parallel: a first-window token encoder 502 and a second-window token encoder 504. But the word-level encoder 114 can include any number of window token encoders operating in parallel (and/or in series). Each window token encoder processes a part of the original input information 104. For example, the first-window token encoder 502 process the first window 402 of FIG. 4, and the second-window token encoder 504 processes the second window 404 of FIG. 4. The operation of the word-level encoder 114 will be explained in the context of the first-window token encoder 502, but the explanation given with respect to the first-window token encoder 502 extends with equal force to the second-window token encoder 504 (and any other window token encoder that is used to process the original input information 104).

As a first operation, the word-level encoder 114 uses a tokenizer (provided by the input-generating component 304 of FIG. 3) to produce a plurality of tokens 506 based on the original input information 104. In part, the tokenizer performs this task by converting the text in original input information 104 into a sequence of tokens. In some cases, these tokens represent individual words or parts of words (such as n-grams). In other cases, the tokenizer uses any type of algorithm to convert text to tokens, such as the WordPiece algorithm or the SentencePiece algorithm, etc. In addition, the tokenizer inserts classification tokens ([CLS] tokens) at the beginning of respective sentences, and separator tokens ([SEP] tokens) at the end of respective sentences. The operation of tokenization can occur before or after the operation of partitioning described with reference to FIG. 4.

More specifically, in the illustrative case of FIG. 1, the tokens 506 associated with the first window 402 include: a first [CLS] token that that designates the start of a first sentence; text tokens associated with respective parts of the first sentence; a first [SEP] token that designates the end of the first sentence; a second [CLS] token that designates the start of a second sentence; text tokens associated with respective parts of the second sentence; a second [SEP] token that designates the end of the second sentence; a third [CLS] token that designates the start of a third sentence; text tokens associated with respective parts of the third sentence; and a third [SEP] token that designates the end of the third sentence. More generally, the collection of tokens 506 will encompass as many sentences (and associated [CLS] and [SEP] tokens) that can be fit into the m tokens associated with the first window 402. As will be described, each classification token [CLS] serves as a vehicle by which the extracting component 106 encodes information regarding a particular sentence.

Different implementations can use different strategies to address the case in which a window ends in the middle of a sentence. In some implementations, the word-level encoder 114 includes the first part such a sentence in the first window 402. It relies on the second window 404 to represent the remainder of the truncated sentence. In other implementations, the word-level encoder will add dummy characters after the last complete sentence, so as to fill out a complete set of m tokens in the window, rather than truncating a sentence. Still other strategies are possible. In some implementations, regardless of the strategy employed, each window begins with a classification token that is associated with the text tokens of a sentence that immediately follows.

Next, the word-level encoder 114 converts the tokens 506 into respective token embeddings 508. In some implementation, the word-level encoder 114 performs this task by using a lookup table to convert the tokens to associated numeric codes. The word-level encoder 114 then uses a lookup table or machine-trained model to convert the codes to embedding vectors. The embedding vectors constitute the token embeddings 508.

Next, the word-level encoder 114 adds segments embeddings 510 and position embeddings 512 to the token embeddings 508. Each segment embedding is a distributed vector that identifies the sentence to which a particular token belongs. In some implementations, the word-level encoder 114 identifies a sequence of sentences using alternating labels, e.g., by identifying the first sentence as segment A, the second sentence as sentence B, the third sentence as segment A, and so on. Each position embedding is a distributed vector that identifies the position of a token in the sequence of tokens 506. In some implementations, the word-level encoder 114 produces position information using a sinusoidal function, which is a technique used in transformer-based models. The combinations of token embeddings, segment embeddings, and position embeddings provide a plurality of position-supplemented embeddings 514, which can more generally be regarded as embedding information.

A transformer model 516 represents an instantiation of the transformer model 312 shown in FIG. 9. (Transformer model '516 used by the second-window token encoder 504 uses a second instantiation of the transformer model 312.) The transformer model 516 converts the position-supplemented embeddings 514 into respective output embeddings 518. Each such output embedding is a distributed vector produced by the transformer model 516 that represents a corresponding token in a vector space. For example, the transformer model 516 converts the position-supplemented embeddings associated with the classification tokens into respective classification embeddings, each of which is denoted in FIG. 5 using the symbol $T_{[CLS]}$. Each classification embedding encodes word-level information regarding a particular sentence. For instance, the first classification embedding encodes information regarding the first sentence in the first window 402.

The first-window encoder 502 produces three classification embeddings, and the second-window encoder produces another three classification embeddings. The modified input information 108 represents all of the classification embeddings produced by all of the window token encoders. In the example of FIG. 5, the word-level encoded information 116 includes the six classification embeddings described above.

The sentence-level encoder 118 converts the classification embeddings to the scores 120. First, the sentence-level encoder 118 adds position embeddings 520 to the respective classification embeddings. This produces position-supplemented embeddings. A transformer model 522 corresponds to an instantiation of the transformer model 314 shown in FIG. 9. The transformer model 522 converts the position-supplemented embeddings into output embeddings. A post-processing component (not shown) converts the output embeddings into the scores 120. In some implementations, the post-processing component is a machine-trained linear transformation layer followed by a Softmax layer (also known as a normalized exponential function layer). Each score identifies the suitability of a corresponding component for inclusion in the modified input information 108. That is, each score identifies the relevance of a sentence to the interpretation of the original input information as a whole. Note that the transformer model 516 and the transformer model 518 are trained together in a single training operation.

FIG. 6 shows the quality of different applications that convert input information to summary information. The quality is specifically measured using the ROGUE-2 metric, which indicates an extent to which bigrams in a generated summary are also found in the input information. A first technique uses just the extracting component 106 to produce the summary information, e.g., by selecting the three most relevant sentences in the original input information 104. A second technique uses just the generative model 110 to produce the summary information. A third technique uses ground-truth extractive summary information in combination with the generative model 110. For example, the ground-truth extractive summary information represents digest information manually produced by humans. A fourth technique uses the extracting component 106 in combination with the generative model 110; this technique is the methodology used by the computing system 102 of FIG. 1, and is therefore referred to below as the "present technique." The horizontal axis represents different input size constraints that apply to the summary information, measured in tokens. As shown in FIG. 6, the fourth technique (the present technique) produces superior results compared to the first two techniques, especially for smaller input size constraints (e.g., for the 2K size constraint).

FIG. 7 compares the quality and latency-related performance of the present technique with the case in which the generative model 110 is used alone. As shown, the present technique offers superior latency performance compared to the use of the standalone generative model 110. In part, the present technique achieves the above effect by using parallel processing to operate on the original input information 104. Further, in certain cases, the extracting component 106 can reduce the original input information 104 below the size limits specified by the generative model 110, which further expedites production of the summary information. The operation of the extracting component 106 itself does not worsen latency to a significant extent. For example, in one case, the extracting component 106 requires 0.4 seconds to perform its operation.

FIG. 8 illustrates the outcome of human evaluation of the present technique compared to the case in which the generative model 110 is used alone. As indicated there, in most cases, the reviewers preferred the summary information produced by the present technique.

B. Illustrative Machine-Trained Models

FIG. 9 shows one implementation of a transformer model 902 used by the extracting component 106. More specifically, the word-level encoder 114 includes the transformer model 312, and the sentence-level encoder 118 includes the transformer model 314 which operates on the output results provided by the transformer model 312. The transformer model 902 shown in FIG. 9 can be considered a description of either the transformer model 312 or the transformer model 314. While the transformer model 312 and the transformer model 314 use the same architecture, these two transformer models (312, 314) have different weights produced by the training system 132 in the same training operation.

The transformer model 902 is composed, in part, of a pipeline of transformer components, including a first transformer component 904. FIG. 9 provides details regarding one way to implement the first transformer component 904. Although not specifically illustrated, other transformer components of the transformer model 902 have the same architecture and perform the same functions as the first transformer component 904 (but are governed by separate sets of weights).

The first transformer component 904 operates on the position-supplemented embedding vectors 906. In some implementations, the first transformer component 904 includes, in order, an attention component 908, a first add-and-normalize component 910, a feed-forward neural network (FFN) component 912, and a second add-and-normalize component 914.

The attention component 908 determines how much emphasis should be placed on parts of input information when interpreting other parts of the input information. Consider, for example, a sentence that reads: "I asked the professor a question, but he could not answer it." When interpreting the word "it," the attention component 908 will determine how much weight or emphasis should be placed on each of the words of the sentence. The attention component 908 will find that that the word "question" is most significant.

In some implementations, the attention component 908 performs the attention operation using the following equation:

$$attn(Q, K, V) = Softmax\left(\frac{QK^T}{\sqrt{d}}\right)V. \quad (1)$$

The attention component 908 produces query information Q by multiplying the position-supplemented embedding vectors 906 by a query weighting matrix $W^Q$. Similarly, the attention component 908 produces key information K and value information V by multiplying the position-supplemented embedding vectors 904 by a key weighting matrix $W^K$ and a value weighting matrix $W^V$, respectively. To execute Equation (1), the attention component 908 takes the dot product of Q with the transpose of K, and then divides the dot product by a scaling factor $\sqrt{d}$, to produce a scaled result The symbol d represents the dimensionality of Q and K. The attention component 908 takes the Softmax (normalized exponential function) of the scaled result, and then multiplies the result of the Softmax operation by V, to produce attention output information. The dot product of Q and K specifically scores the relations between vectors in the position-supplemented embedding vector 406. In some cases, the attention component 908 is said to perform masked attention insofar as the attention component 908 masks output token information that, at any given time, has not yet been determined. Background information regarding the general concept of attention is provided in Vaswani, et al., "Attention Is All You Need," in 31st Conference on Neural Information Processing Systems (NIPS 2017), 2017, 9 pages.

Note that FIG. 9 shows that the attention component 908 is composed of plural attention heads, including a representative attention head 916. Each attention head performs the computations specified by Equation (1), but with respect to a particular representational subspace that is different than the subspaces of the other attention heads. To accomplish this operation, the attention heads perform the computations described above using different respective sets of query, key, and value weight matrices. Although not shown, the attention component 908 concatenates the output results of the attention component's separate attention heads, and then multiplies the results of this concatenation by another weight matrix $W^O$.

The add-and-normalize component 910 includes a residual connection that combines (e.g., sums) input information fed to the attention component 908 with the output information generated by the attention component 908. The add-and-normalize component 910 then normalizes the output information generated by the residual connection, e.g., by normalizing values in the output information based on the mean and standard deviation of those values. The other add-and-normalize component 914 performs the same functions as the first-mentioned add-and-normalize component 910. The FFN component 912 transforms input information to output information using a feed-forward neural network having any number of layers.

The first transformer component 904 produces output embedding information 918. A series of other transformer components (920, . . . , 922) perform the same functions as the first transformer component 904, each operating on output embedding information produced by its immediately preceding transformer component. Each transformer component uses its own level-specific set of machine-trained weights. The final transformer component 922 in the transformer model 902 produces final output embedding information 924.

In the case of the transformer model 314 of the sentence-level encoder 118, a post-processing component (not shown) performs post-processing operations on the final output embedding information 924. For example, the post-processing component performs a machine-trained linear transformation on the final output embedding information 924, and processes the results of this transformation using a Softmax component (not shown).

FIG. 10 show one implementation of the generative model 110. In this particular case, the generative model 110 has an encoder-decoder architecture. That is, the generative model 110 includes an encoder 1002 and a decoder 1004. The encoder 1002 converts input information to encoder output information. The decoder 1004 converts the encoder output information and decoder input information into decoder output information.

In some implementations, the encoder 1002 is implemented using the functionality of the transformer model 902 shown in FIG. 9. In some implementations, the decoder 1004 includes a pipeline of one or more decoder components, a first of which is illustrated in FIG. 10. More specifically, the decoder 1004 shown in FIG. 10 includes a first attention component 1006, a first add-and-normalize component 1008, an encoder-decoder attention component 1010, a second add-and-normalize component 1012, an FFN component 1014, and a third add-and-normalize component 1016.

The first attention component 1006 performs masked self-attention on the decoder input information fed to it using Equation (1). The first attention component 1006 performs masking so that currently-unknown tokens in a sequence, after a last-predicted token, do not bias its results. The encoder-decoder attention component 1010 performs cross-attention based on the encoder output information generated by the encoder 1002 and the output information supplied by the first add-and-normalize component 1008. The encoder-decoder attention component 1010 also uses Equation (1) to perform its functions, but the encoder-decoder attention component 1010 uses the encoder output information to generate the key formation K and the value information V, and uses the output information fed to it by the first add-and-normalize component 1008 to generate the query information Q. The add-and-normalize components (1008, 1012, 1016) and the FFN component 1014 perform the same functions described above with respect to FIG. 9.

The dashed-line loop 1018 indicates that the decoder 1004 operates in an auto-regressive manner. To operate in this way, a post-processing component (not shown) predicts the next token to follow a last-generated token. The decoder 1004 then appends the next token to the end of a sequence of tokens fed to the decoder 1004, to provide an updated sequence of tokens. In a next pass, the decoder 1004 processes the updated sequence of tokens to generate a next output token. The decoder 1004 repeats the above process until it generates a specified stop token.

In other implementations, the generative model 110 uses a decoder-only architecture that omits the encoder 1002. In such an architecture, each decoder component will omit the encoder-decoder attention component 1010 and its associated add-and-normalize component 1012.

In some implementations, the generative model 110 is built, at least in part, using an "off-the-shelf" language model having weights produced by others using a pre-training operation. A publicly-available transformer-based model for performing pattern completion is the BLOOM model available from HUGGING FACE, INC., of New York, New York, one version of which is Version 1.3 released on Jul. 6, 2022.

As stated above, other implementations of the extracting component 106 and the generative model 110 uses other kinds of machine-trained models besides, or in addition to, the particular transformer-based architectures shown in FIGS. 9 and 10. The other machine-trained models include CNNs, RNNs, FFNS, stable diffusion models, etc., or any combination thereof.

An attention operation, as described above, considers the relations among parts of input information. By reducing the size of the input information, the attention operations used by the generative model 110 need to consider fewer relations. The complexity of other operations is similarly reduced in complexity. As a further consequence, the processing operations performed by the generative model 110 require fewer resources (for example, by requiring less memory to store the information as it is processed). This improvement also manifests itself in improved latency. FIG. 7, for example, shows that, for a generative model having an input size constraint of 8K, it takes 7.6 seconds to process an input example without the use of the extracting component 114. In contrast, it takes 4.0 seconds to process the input example with the inclusion of the extracting component 114.

C. Illustrative Training Systems

The training system 132 of FIG. 1 trains the transformer model 308 shown in FIG. 3 used by the extracting component 106 (as shown in FIG. 5). As described above, the transformer model 308 has two parts: a transformer model 312 and a transformer model 314. The training system 132 operates on a set of training examples. Each training example provides an illustrative document and a subset of sentences in the document which are most aptly suited to producing a high-quality summary of the document. The subset of sentences constitutes ground-truth information. The ground-truth information can be produced manually, or by an example-harvesting component (not shown). In some implementation, the example-harvesting component picks the sentences in the document that are closest to an accepted summary of the document. For example, the example-harvesting component converts the sentences in the document to a first set of sentence vectors, and converts the sentences in accepted summary to a second set of sentence vectors. The example-harvesting component then uses any metric (such as cosine similarity) to find the first sentence vectors that are closest to any of the second sentence vectors.

After generating the training set, the training system 132 iteratively derives the weights of the transformer model 308 using any training technique, such as stochastic gradient descent in combination with back projection. In this learning process, the training system 132 can use any loss function (such as binary cross-entropy) to measure the difference between instances of ground-truth information (produced in the manner described above) and model-predicted summary information generated by the transformer model 308 being trained. Note that the transformer model 312 (corresponding to a first part of the transformer model 308 used by the word-level encoder 114) and the transformer model 314 (used by a second part of the transformer model 308 used by the sentence-level encoder 118) are trained together. This means that loss information produced by the loss function is back-propagated through the layers of the transformer models (312, 314), and weights of the transformer models (312, 314) are updated in response thereto.

The training system 134 trains the generative model 110 using any technique, separate from the training performed by the training system 132. In one implementation, the generative model 110 first undergoes pre-training. Here, the training system 134 trains the generative model 110 with respect to one or more generic language-model tasks, unrelated to specific functions performed by the computing system 102. In a first language-modeling task, for example, the training system 134 randomly masks tokens in a sequence of input tokens input to the generative model 110. The training system 134 assesses an extent to which the generative model 110 can successfully predict the identities of the masked tokens, and updates the weights of the generative model 110 accordingly. In a second language-modeling task, the training system 134 feeds two concatenated sentences to the generative model 110, including a first sentence and a second sentence. The training system 134 then measures an extent to which the generative model 110 can successfully predict whether the second sentence properly follows the first sentence (with reference to ground-truth information that indicates whether the second sentence properly follows the first sentence), and then updates the weights of the generative model 110 accordingly. Background on the general task of pre-training language models is provided in Devlin, et al., "BERT: Pre-training of Deep Bidirectional Transformers for Language Understanding," arXiv, Cornell University, arXiv: 1810.04805v2 [cs.CL], May 24, 2019, 16 pages.

In some implementations, the training system 134 optionally fine-tunes the generative model 110 to perform one or more specific tasks, with reference to another set of training examples. An illustrative training example includes a passage of text and an instance of ground-truth information that is considered to be an appropriate abstractive summary of the passage of text. In this process, the training system 134 iteratively refines the weights of the generative model 110 using any training technique, such as stochastic gradient descent in combination with back projection. In this learning process, the training system 134 iteratively adjusts the weights of the generative model 110 to reduce differences between instances of ground-truth information and corresponding instances of model-predicted output information. In one case, an instance of the ground-truth information describes an accepted abstractive summary for a passage of text under consideration, and an instance of the model-predicted output information corresponds to summary information produced by the generative model 110 for the passage of text.

D. Illustrative Processes

Figure 13:
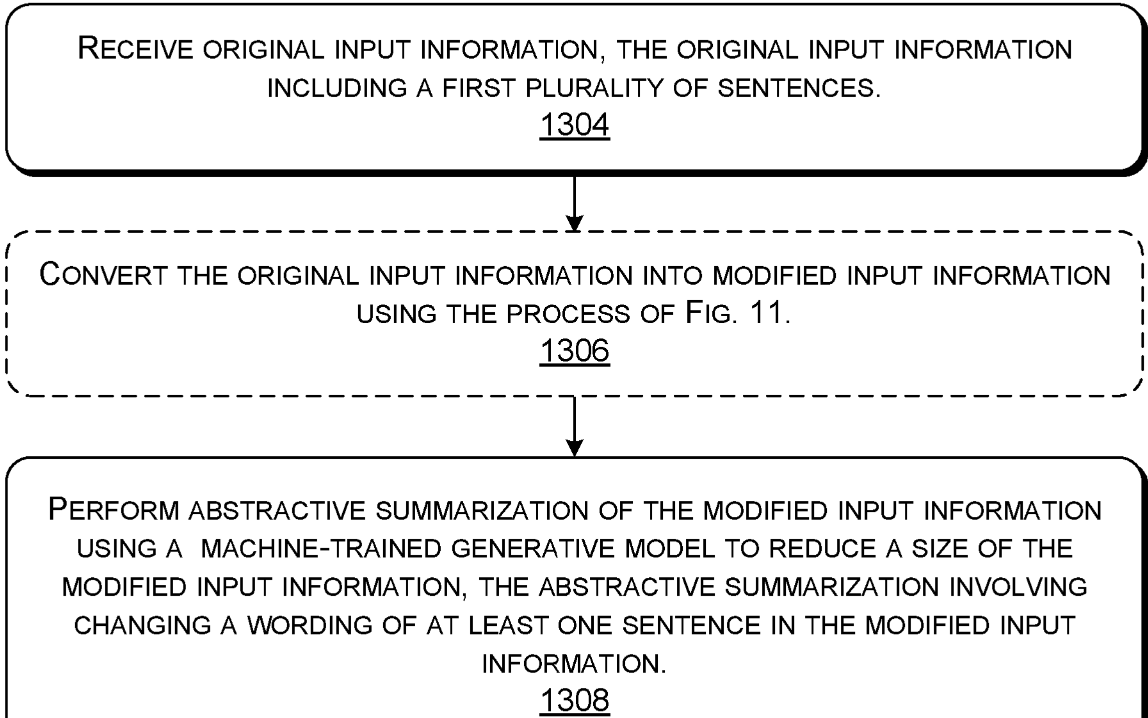

FIGS. 11-13 show three processes that represent an overview of the operation of the computing system 102 of FIG. 1. Each of the processes is expressed as a series of operations performed in a particular order. But the order of these operations is merely representative, and the operations are capable of being varied in other implementations. Further, any two or more operations described below can be performed in a parallel manner. In one implementation, the blocks shown in the processes that pertain to processing-related functions are implemented by the computing equipment described in connection with FIGS. 14 and 15.

More specifically, FIG. 11 shows a process 1102 for interacting with a machine-trained generative model (e.g., the generative model 110). In block 1104, the computing system 102 receives original input information (e.g., the original input information 104), the original input information including a first plurality of sentences. In block 1106, the computing system 102 performs word-level encoding of the original input information using a first part of a machine-trained transformer model (e.g., the transformer model 308), to provide word-level encoded information (e.g., the word-level encoded information 116). In block 1108, the computing system 102 performs sentence-level encoding of the word-level encoded information using a second part of the machine-trained transformer model, to provide scores (e.g., scores 120) associated with the first plurality of sentences. Each score identifies a relevance of a corresponding sentence to an interpretation of the original input information. The model weights used in the first part and the second part of the machine-trained transformer model are trained together. In block 1110, the computing system 102 selects a subset of the first plurality of sentences in the original input information based on the scores, to provide modified input information (e.g., the modified input information 108) having a second plurality of sentences, the second plurality of sentences having fewer sentences than the first plurality of sentences. In block 1112, the computing system 102 provides the modified input information to the machine-trained generative model, the machine-trained generative model being trained to convert the modified input information into output information (e.g., the output information 112) that is consumable by an output device.

FIG. 12 shows another process 1202 for interacting with a machine-trained generative model (e.g., the generative model 110). In block 1204, the computing system 102 receives original input information (e.g., the original input information 104) that includes a first plurality of sentences. In block 1206, the computing system 102 partitions the original input information into a plurality of windows, each window having a given length that encompasses a part of the original input information, and each window that has a preceding window overlapping the preceding window by a prescribed amount of information. In block 1208, the computing system 102 performs word-level encoding by converting the plurality of windows to a plurality of instances of word-level encoded information in parallel. In block 1210, the computing system 102 performs sentence-level encoding by converting the plurality of instances of word-level encoded information to a plurality of scores (e.g., the scores 120), each score identifying a relevance of a corresponding sentence to an interpretation of the original input information. The model weights used in blocks 1208 and 1210 are trained together. In block 1212, the computing system 102 selects a subset of the first plurality of sentences in the original input information based on the scores, to provide modified input information (e.g., the modified input information 108) having a second plurality of sentences, the second plurality of sentences having fewer sentences than the first plurality of sentences. In block 1214, the computing system 102 provides the modified input information to the machine-trained generative model, the machine-trained generative model being trained to convert the modified input information into output information (e.g., the output information 112) that is consumable by an output device.

FIG. 13 shows a process 1302 for performing abstractive summarization. In block 1304, the computing system 102 receives original input information (e.g., the original input information 104), the original input information including a first plurality of sentences. In block 1306, the computing system 102 converts the original input information into modified input information (e.g., the modified input information 108) using the process 1102 of FIG. 11. In block 1308, the computing system 102 performs abstractive summarization of the modified input information using a machine-trained generative model (e.g., the generative model 110), the abstractive summarization involving changing a wording of at least one sentence in the modified input information to reduce a size of the modified input information.

E. Illustrative Computing Functionality

FIG. 14 shows computing equipment 1402 that, in some implementations, is used to implement the computing system 102 of FIG. 1. The computing equipment 1402 includes a set of local devices 1404 coupled to a set of servers 1406 via a computer network 1408. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, an immersive "cave," a media device, a vehicle-borne computing system, any type of robot computing system, a computing system in a manufacturing system, etc. In some implementations, the computer network 1408 is implemented as a local area network, a wide area network (e.g., the Internet), one or more point-to-point links, or any combination thereof.

The dashed-line box in FIG. 14 indicates that the functionality of the computing system 102 is capable of being spread across the local devices 1404 and/or the servers 1406 in any manner. For instance, in some cases, each local device, or a group of affiliated local devices, implements the entirety the computing system 102. In other implementations, the servers 1406 implement the entirety of the computing system 102. Here, an individual user interacts with the servers 1406 via a browser application or other local functionality provided by a local device. In other implementations, the functions of the computing system 102 are distributed between each local device and the server 1406. For example, in one case, the servers 1706 provide an execution platform that implement the generative model 110, and each local device implements an instance of the extracting component 106.

FIG. 15 shows a computing system 1502 that, in some implementations, is used to implement any aspect of the mechanisms set forth in the above-described figures. For instance, in some implementations, the type of computing system 1502 shown in FIG. 15 is used to implement any local computing device or any server shown in FIG. 18. In all cases, the computing system 1502 represents a physical and tangible processing mechanism.

The computing system 1502 includes a processing system 1504 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), and/or one or more Tensor Processing Units (TPUs), etc. More generally, any processor corresponds to a general-purpose processing unit or an application-specific processor unit.

The computing system 1502 also includes computer-readable storage media 1506, corresponding to one or more computer-readable media hardware units. The computer-readable storage media 1506 retains any kind of information 1508, such as machine-readable instructions, settings, model weights, and/or other data. In some implementations, the computer-readable storage media 1506 includes one or more solid-state devices, one or more magnetic hard disks, one or more optical disks, magnetic tape, etc. Any instance of the computer-readable storage media 1506 uses any technology for storing and retrieving information. Further, any instance of the computer-readable storage media 1506 represents a fixed or removable unit of the computing system 1502. Further, any instance of the computer-readable storage media 1506 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media; a computer-readable storage medium or storage device is "non-transitory" in this regard.

The computing system 1502 utilizes any instance of the computer-readable storage media 1506 in different ways. For example, in some implementations, any instance of the computer-readable storage media 1506 represents a hardware memory unit (such as random access memory (RAM)) for storing information during execution of a program by the computing system 1502, and/or a hardware storage unit (such as a hard disk) for retaining/archiving information on a more permanent basis. In the latter case, the computing system 1502 also includes one or more drive mechanisms 1510 (such as a hard drive mechanism) for storing and retrieving information from an instance of the computer-readable storage media 1506.

In some implementations, the computing system 1502 performs any of the functions described above when the processing system 1504 executes computer-readable instructions stored in any instance of the computer-readable storage media 1506. For instance, in some implementations, the computing system 1502 carries out computer-readable instructions to perform each block of the processes described in with reference to FIGS. 11-13. FIG. 15 generally indicates that hardware logic circuitry 1512 includes any combination of the processing system 1504 and the computer-readable storage media 1506.

In addition, or alternatively, the processing system 1504 includes one or more other configurable logic units that perform operations using a collection of logic gates. For instance, in some implementations, the processing system 1504 includes a fixed configuration of hardware logic gates, e.g., that are created and set at the time of manufacture, and thereafter unalterable. In addition, or alternatively, the processing system 1504 includes a collection of programmable hardware logic gates that are set to perform different application-specific tasks. The latter category of devices includes Programmable Array Logic Devices (PALs), Generic Array Logic Devices (GALs), Complex Programmable Logic Devices (CPLDs), Field-Programmable Gate Arrays (FPGAs), etc. In these implementations, the processing system 1504 effectively incorporates a storage device that stores computer-readable instructions, insofar as the configurable logic units are configured to execute the instructions and therefore embody or store these instructions.

In some cases (e.g., in the case in which the computing system 1502 represents a user computing device), the computing system 1502 also includes an input/output interface 1514 for receiving various inputs (via input devices 1516), and for providing various outputs (via output devices 1518). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1520 and an associated graphical user interface presentation (GUI) 1522. The display device 1520 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1502 also includes one or more network interfaces 1524 for exchanging data with other devices via one or more communication conduits 1526. One or more communication buses 1528 communicatively couple the above-described units together.

The communication conduit(s) 1526 is implemented in any manner, e.g., by a local area computer network, a wide area computer network (e.g., the Internet), point-to-point connections, or any combination thereof. The communication conduit(s) 1526 include any combination of hardwired links, wireless links, routers, gateway functionality, name servers, etc., governed by any protocol or combination of protocols.

FIG. 15 shows the computing system 1502 as being composed of a discrete collection of separate units. In some cases, the collection of units corresponds to discrete hardware units provided in a computing device chassis having any form factor. FIG. 15 shows illustrative form factors in its bottom portion. In other cases, the computing system 1502 includes a hardware logic unit that integrates the functions of two or more of the units shown in FIG. 15. For instance, in some implementations, the computing system 1502 includes a system on a chip (SoC or SOC), corresponding to an integrated circuit that combines the functions of two or more of the units shown in FIG. 15.

The following summary provides a set of illustrative examples of the technology set forth herein.

(A1) According to one aspect, a method (e.g., the process 1102) is described for interacting with a machine-trained generative model (e.g., the machine-trained generative model 110). The method includes: receiving (e.g., in block 1104) original input information (e.g., the original input information 104), the original input information including a first plurality of sentences; performing (e.g., in block 1106) word-level encoding of the original input information using a first part of a machine-trained transformer model (e.g., the transformer model 308), to provide word-level encoded information (e.g., the word-level encoded information 116); performing (e.g., in block 1108) sentence-level encoding of the word-level encoded information using a second part of the machine-trained transformer model, to provide scores (e.g., the scores 120) associated with the first plurality of sentences, each score identifying a relevance of a corresponding sentence to an interpretation of the original input information, wherein model weights used in the first part and the second part of the machine-trained transformer model are trained together; selecting (e.g., in block 1110) a subset of the first plurality of sentences in the original input information based on the scores, to provide modified input information (e.g., the modified input information 108) having a second plurality of sentences, the second plurality of sentences having fewer sentences than the first plurality of sentences; and providing (e.g., in block 1112) the modified input information to the machine-trained generative model (e.g., the machine-trained generative model 110), the machine-trained generative model being trained to convert the modified input information into output information (e.g., the output information 112) that is consumable by an output device.

According to one illustrative characteristic, the method decreases the amount of information provided to the generative model. Decreasing the information reduces an amount of processing operations that the generative model is requested to perform. As a further consequence, decreasing the information reduces expenditure of resources by the generative model, and improves latency at which the generative model delivers its responses. This is because the generative model consumes resources and time to process each token. The method also improves the quality of the generative model response in some cases (A2) According to some implementations of the method of A1, the method further includes partitioning the original input information into a plurality of windows, each window having a given length that encompasses a part of the original input information. The operation of performing word-level encoding includes converting the plurality of windows to a plurality of instances of word-level encoded information. The operation of performing sentence-level encoding includes converting the plurality of instances of word-level encoded information to the plurality of scores.

(A3) According to some implementations of the method of A2, each window that has a preceding window overlaps the preceding window by a prescribed amount of information.

(A4) According to some implementations of the methods of A2 or A3, the word-level encoding converts the plurality of windows to the plurality of instances of word-level encoded information in parallel.

(A5) According to some implementations of any of the methods of A2-A4, after tokenizing the original input information into tokens, the plurality of windows includes a plurality of classification tokens, each particular classification token being associated with a particular sentence in the first plurality of sentences. The plurality of instances of word-level encoded information include a plurality of classification embeddings that represent respective transformed counterparts of the plurality of classification tokens. The operation of performing sentence-level encoding includes converting the plurality of classification embeddings into the scores associated with the first plurality of sentences.

(A6) According to some implementations of any of the methods of A1-A5, the operation of selecting includes: choosing a group of sentences in the first plurality of sentences having scores that satisfy a prescribed suitability criterion; and ordering sentences in the group of sentences according to an order in which the sentences in the group appear in the first plurality of sentences.

(A7) According to some implementations of any of the methods of A1-A6, a first sentence in the original input information is included as a first sentence in the modified input information.

(A8) According to some implementations of any of the methods of A1-A7, the modified input information has a size that is less than or equal to an input size constraint associated with the machine-trained generative model.

(A9) According to some implementations of any of the methods of A1-A8, the machine-trained transformer model includes an attention operation for processing input embedding information by determining relevance of a first part of the input embedding information when interpreting a second part of the input embedding information.

(A10) According to some implementations of any of the methods of A1-A9, the machine-trained generative model includes an attention operation for processing input embedding information by determining relevance of a first part of the input embedding information when interpreting a second part of the input embedding information.

(A11) According to some implementations of any of the methods of A1-A10, the machine-trained generative model performs abstractive summarization of the modified input information to reduce a size of the modified input information, the abstractive summarization involving changing a wording of at least one sentence in the modified input information.

(A12) According to some implementations of any of the methods of A1-A11, the machine-trained generative model is a chat engine, question-answering engine, or reading comprehension engine.

(A13) According to some implementations of any of the methods of A1-A12, the machine-trained transformer model is trained separately from the machine-trained generative model.

(B1) According to a second aspect, a method (e.g., the process 1302) is described for performing abstractive summarization. The method incudes: receiving (e.g., in block 1304) original input information (e.g., the original input information 104), the original input information including a first plurality of sentences; performing (e.g., in block 1106) word-level encoding of the original input information using machine-trained transformer model (e.g., the transformer model 516), to provide word-level encoded information (e.g., the word-level encoded information 116); performing (e.g., in block 1108) sentence-level encoding of the word-level encoded information using the machine-trained transformer model, to provide scores (e.g., the scores 120) associated with the first plurality of sentences, each score identifying a relevance of a corresponding sentence to an interpretation of the original input information, wherein model weights used in the first part and the second part of the machine-trained transformer model are trained together; selecting (e.g., in block 1110) a subset of the first plurality of sentences in the original input information based on the scores, to provide modified input information (e.g., the modified input information 108) having a second plurality of sentences, the second plurality of sentences having fewer sentence than the first plurality of sentences; and performing (e.g., in block 1308) abstractive summarization of the modified input information using a machine-trained generative model (e.g., the classification model 110) to reduce a size of the modified input information, the abstractive summarization involving changing a wording of at least one sentence in the modified input information (e.g., the output information 112). The second aspect has at least the same technical advantages as the first aspect.

(C1) According to a third aspect, a method (e.g., the process 1202) is described for interacting with a machine-trained generative model (e.g., the generative model 110). The method includes: receiving (e.g., in block 1204) original input information (e.g., the original input information 104), the original input information including a first plurality of sentences; partitioning (e.g., in block 1206) the original input information into a plurality of windows, each window having a given length that encompasses a part of the original input information, and each window that has a preceding window overlapping the preceding window by a prescribed amount of information; performing (e.g., in block 1208) word-level encoding by converting the plurality of windows to a plurality of instances of word-level encoded information in parallel; performing (e.g., in block 1210) sentence-level encoding by converting the plurality of instances of word-level encoded information to a plurality of scores (e.g., the scores 120), each score identifying a relevance of a corresponding sentence to an interpretation of the original input information, wherein model weights used in the performing word-level encoding and performing sentence-level encoding are trained together; selecting (e.g., in block 1212) a subset of the first plurality of sentences in the original input information based on the scores, to provide modified input information (e.g., the modified input information 108) having a second plurality of sentences, the second plurality of sentences having fewer sentences than the first plurality of sentences; and providing (e.g., in block 1214) the modified input information to the machine-trained generative model, the machine-trained generative model being trained to convert the modified input information into output information (e.g., the output information 112) that is consumable by an output device. The third aspect has at least the same technical advantages as the first aspect.

In yet another aspect, some implementations of the technology described herein include a computing system (e.g., the computing system 1502) that includes a processing system (e.g., the processing system 1504) having a processor. The computing system also includes a storage device (e.g., the computer-readable storage media 1506) for storing computer-readable instructions (e.g., information 1508). The processing system executes the computer-readable instructions to perform any of the methods described herein (e.g., any individual method of the methods of A1-A13, B1, or C1).

In yet another aspect, some implementations of the technology described herein include a computer-readable storage medium (e.g., the computer-readable storage media 1506) for storing computer-readable instructions (e.g., the information 1508). A processing system (e.g., the processing system 1504) executes the computer-readable instructions to perform any of the operations described herein (e.g., the operation in any individual method of the methods of A1-A13, B1, or C1).

More generally stated, any of the individual elements and steps described herein are combinable into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1512 of FIG. 15. The term "logic" likewise encompasses various physical and tangible mechanisms for performing a task. For instance, each processing-related operation illustrated in the flowcharts of FIGS. 11-13 corresponds to a logic component for performing that operation.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for interacting with a machine-trained generative model, comprising:

receiving original input information, the original input information including a first plurality of sentences;

performing word-level encoding of the original input information using a first part of a machine-trained transformer model, to provide word-level encoded information;

performing sentence-level encoding of the word-level encoded information using a second part of the machine-trained transformer model, to provide scores associated with the first plurality of sentences, each score identifying a relevance of a corresponding sentence to an interpretation of a meaning of the first plurality of sentences of the original input information as a whole, wherein model weights used in the first part and the second part of the machine-trained transformer model are trained together;

selecting a subset of the first plurality of sentences in the original input information based on the scores, to provide modified input information having a second plurality of sentences, the second plurality of sentences having fewer sentences than the first plurality of sentences; and providing the modified input information to the machine-trained generative model, the machine-trained generative model being trained to convert the modified input information into output information that is consumable by an output device, further comprising partitioning the original input information into a plurality of windows, each window having a given length that encompasses a part of the original input information, wherein the performing word-level encoding includes converting the plurality of windows to a plurality of instances of word-level encoded information, and wherein the performing sentence-level encoding includes converting the plurality of instances of word-level encoded information to the plurality of scores.

2. The method of claim 1, wherein each window that has a preceding window overlaps the preceding window by a prescribed amount of information.

3. The method of claim 1, wherein the word-level encoding converts the plurality of windows to the plurality of instances of word-level encoded information in parallel.

4. The method of claim 1, wherein, after tokenizing the original input information into tokens, the plurality of windows includes a plurality of classification tokens, each particular classification token being associated with a particular sentence in the first plurality of sentences, wherein the plurality of instances of word-level encoded information include a plurality of classification embeddings that represent respective transformed counterparts of the plurality of classification tokens, and wherein the performing sentence-level encoding includes converting the plurality of classification embeddings into the scores associated with the first plurality of sentences.

5. The method of claim 1, wherein the selecting includes:

choosing a group of sentences in the first plurality of sentences that have scores that satisfy a prescribed suitability criterion; and ordering sentences in the group of sentences according to an order in which the sentences in the group appear in the first plurality of sentences.

6. The method of claim 1, wherein a first sentence in the original input information is included as a first sentence in the modified input information.

7. The method of claim 1, wherein the modified input information has a size that is less than or equal to an input size constraint associated with the machine-trained generative model.

8. The method of claim 1, wherein the machine-trained transformer model includes an attention operation for processing input embedding information by determining relevance of a first part of the input embedding information when interpreting a second part of the input embedding information.

9. The method of claim 1, wherein the machine-trained generative model includes an attention operation for processing input embedding information by determining relevance of a first part of the input embedding information when interpreting a second part of the input embedding information.

10. The method of claim 1, wherein the machine-trained generative model performs abstractive summarization of the modified input information to reduce a size of the modified input information, the abstractive summarization involving changing a wording of at least one sentence in the modified input information, and wherein the machine-trained generative model is a chat engine, question-answering engine, or reading comprehension engine.

11. The method of claim 1, wherein the machine-trained transformer model includes weights that have been trained based on training examples, wherein each of the training examples provides a document and a subset of sentences in the document which are suited to producing a summary of the document, and wherein the subset of sentences constitute ground-truth information against which model-predicted summary information generated by the machine-trained transformer model has been compared.

12. The method of claim 1, wherein the machine-trained transformer model is trained separately from the machine-trained generative model.

13. A computing system for performing abstractive summarization, comprising:

a data store for storing computer-readable instructions;

a processing system for executing the computer-readable instructions in the data store, to perform operations including:

receiving original input information, the original input information including a first plurality of sentences;

performing word-level encoding of the original input information using a first part of a machine-trained transformer model, to provide word-level encoded information;

performing sentence-level encoding of the word-level encoded information using a second part of the machine-trained transformer model, to provide scores associated with the first plurality of sentences, each score identifying a relevance of a corresponding sentence to an interpretation of a meaning of the first plurality of sentences of the original input information as a whole, wherein model weights used in the first part and the second part of the machine-trained transformer model are trained together;

selecting a subset of the first plurality of sentences in the original input information based on the scores, to provide modified input information having a second plurality of sentences, the second plurality of sentences having fewer sentences than the first plurality of sentences; and performing abstractive summarization of the modified input information using a machine-trained generative model to reduce a size of the modified input information, the abstractive summarization involving changing a wording of at least one sentence in the modified input information, further comprising partitioning the original input information into a plurality of windows, each window having a given length that encompasses a part of the original input information, wherein the performing word-level encoding includes converting the plurality of windows to a plurality of instances of word-level encoded information, and wherein the performing sentence-level encoding includes converting the plurality of instances of word-level encoded information to the plurality of scores.

14. The computing system of claim 13, wherein each window that has a preceding window overlaps the preceding window by a prescribed amount of information.

15. The computing system of claim 13, wherein the word-level encoding converts the plurality of windows to the plurality of instances of word-level encoded information in parallel.

16. The computing system of claim 13, wherein, after tokenizing the original input information into tokens, the plurality of overlapping windows includes a plurality of classification tokens, each particular classification token being associated with a particular sentence in the first plurality of sentences, wherein the plurality of instances of word-level encoded information include a plurality of classification embeddings that represent respective transformed counterparts of the plurality of classification tokens, and wherein the performing sentence-level encoding includes converting the plurality of classification embeddings into the scores associated with the first plurality of sentences.

17. A computer-readable storage medium for storing computer-readable instructions, a processing system executing the computer-readable instructions to perform operations, the operations comprising:

receiving original input information, the original input information including a first plurality of sentences;

partitioning the original input information into a plurality of windows, each window having a given length that encompasses a part of the original input information, and each window that has a preceding window overlapping the preceding window by a prescribed amount of information;

performing word-level encoding by converting the plurality of windows to a plurality of instances of word-level encoded information, the word level-encoding being performed by at least two instances of processing resources that operate in parallel on two respective windows;

performing sentence-level encoding by converting the plurality of instances of word-level encoded information to a plurality of scores, each score identifying a relevance of a corresponding sentence to an interpretation of a meaning of the first plurality of sentences of the original input information as a whole, wherein model weights used in the performing word-level encoding and performing sentence-level encoding are trained together;

selecting a subset of the first plurality of sentences in the original input information based on the scores, to provide modified input information having a second plurality of sentences, the second plurality of sentences having fewer sentences than the first plurality of sentences; and providing the modified input information to a machine-trained generative model, the machine-trained generative model being trained to convert the modified input information into output information that is consumable by an output device, wherein, after tokenizing the original input information into tokens, the plurality of windows includes a plurality of classification tokens, each particular classification token being associated with a particular sentence in the first plurality of sentences, wherein the plurality of instances of word-level encoded information include a plurality of classification embeddings that represent respective transformed counterparts of the plurality of classification tokens, and wherein the performing sentence-level encoding includes converting the plurality of classification embeddings into the scores associated with the first plurality of sentences.

* * * * *